US012278790B2

(12) United States Patent
Zhang et al.

(10) Patent No.: US 12,278,790 B2
(45) Date of Patent: Apr. 15, 2025

(54) MOBILITY REPORTING FOR FULL-DUPLEX COMMUNICATION OR SIMULTANEOUS HALF-DUPLEX COMMUNICATION WITH MULTIPLE TRANSMIT RECEIVE POINTS

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/305,010

(22) Filed: Jun. 29, 2021

(65) Prior Publication Data

US 2022/0014344 A1 Jan. 13, 2022

Related U.S. Application Data

(60) Provisional application No. 62/705,689, filed on Jul. 10, 2020.

(51) Int. Cl.
*H04L 5/14* (2006.01)
*H04B 17/318* (2015.01)
(Continued)

(52) U.S. Cl.
CPC .............. *H04L 5/14* (2013.01); *H04B 17/318* (2015.01); *H04W 8/02* (2013.01); *H04W 36/0085* (2018.08); *H04W 36/085* (2023.05)

(58) Field of Classification Search
None
See application file for complete search history.

(56) References Cited

U.S. PATENT DOCUMENTS

2017/0187416 A1* 6/2017 Kim ................... H04W 72/0446
2018/0048442 A1* 2/2018 Sang ..................... H04L 5/0023
(Continued)

FOREIGN PATENT DOCUMENTS

| WO | WO-2020040530 A1 | 2/2020 |
| WO | WO-2020131940 A1 | 6/2020 |

OTHER PUBLICATIONS

International Search Report and Written Opinion—PCT/US2021/070797—ISA/EPO—Oct. 8, 2021.

*Primary Examiner* — Chirag G Shah
*Assistant Examiner* — Suk Jin Kang
(74) *Attorney, Agent, or Firm* — Harrity & Harrity, LLP

(57) ABSTRACT

Various aspects of the present disclosure generally relate to wireless communication. In some aspects, a user equipment (UE) may measure, while communicating with a serving transmit receive point (TRP) in a half-duplex communication mode, one or more synchronization signal block (SSB) beams associated with one or more neighbor TRPs. The UE may transmit, to a base station, a mobility report indicating at least one candidate TRP based at least in part on determining that an SSB beam transmitted by the at least one candidate TRP satisfies criteria to be paired in a full-duplex communication mode or a simultaneous half-duplex multi-TRP (mTRP) communication mode. Numerous other aspects are provided.

30 Claims, 11 Drawing Sheets

(51) Int. Cl.
*H04W 8/02* (2009.01)
*H04W 36/00* (2009.01)
*H04W 36/08* (2009.01)

(56) References Cited

U.S. PATENT DOCUMENTS

| | | | |
|---|---|---|---|
| 2018/0199328 A1* | 7/2018 | Sang | H04B 7/0617 |
| 2018/0287739 A1* | 10/2018 | Kim | H04J 11/0023 |
| 2018/0331805 A1* | 11/2018 | Xia | H04B 7/088 |
| 2019/0104544 A1* | 4/2019 | Axnäs | H04W 74/004 |
| 2019/0110291 A1* | 4/2019 | Yi | H04W 72/0446 |
| 2019/0140811 A1* | 5/2019 | Abedini | H04L 5/14 |
| 2019/0253089 A1* | 8/2019 | Wu | H04B 1/0475 |
| 2019/0306858 A1* | 10/2019 | Stirling-Gallacher | H04W 72/048 |
| 2019/0364596 A1* | 11/2019 | Axnäs | H04W 72/0446 |
| 2019/0372806 A1* | 12/2019 | Park | H04W 52/146 |
| 2020/0008230 A1* | 1/2020 | Yu | H04L 5/0005 |
| 2020/0022010 A1* | 1/2020 | Kim | H04W 24/02 |
| 2020/0022040 A1* | 1/2020 | Chen | H04W 76/27 |
| 2020/0177254 A1* | 6/2020 | Lee | H04B 7/0632 |
| 2020/0196230 A1* | 6/2020 | John Wilson | H04W 8/245 |
| 2020/0220585 A1* | 7/2020 | John Wilson | H04B 7/0626 |
| 2020/0359404 A1* | 11/2020 | Nilsson | H04W 72/046 |
| 2020/0383091 A1* | 12/2020 | Park | H04W 72/042 |
| 2021/0068029 A1* | 3/2021 | Wong | H04W 72/0426 |
| 2021/0159966 A1* | 5/2021 | Xi | H04L 5/0023 |
| 2021/0167821 A1* | 6/2021 | Chen | H04B 7/0617 |
| 2021/0184739 A1* | 6/2021 | Sang | H04L 5/0048 |
| 2021/0185647 A1* | 6/2021 | Rahman | H04W 72/23 |
| 2021/0211176 A1* | 7/2021 | Gao | H04B 7/0632 |
| 2021/0288696 A1* | 9/2021 | Jung | H04B 7/0626 |
| 2021/0360618 A1* | 11/2021 | Novlan | H04W 72/0446 |
| 2021/0360649 A1* | 11/2021 | Athley | H04B 7/0695 |
| 2021/0367660 A1* | 11/2021 | Jo | H04B 7/15542 |
| 2022/0030626 A1* | 1/2022 | Bayesteh | H04L 5/0048 |
| 2022/0116097 A1* | 4/2022 | Marinier | H04W 52/52 |
| 2022/0158805 A1* | 5/2022 | Frenne | H04W 72/042 |
| 2022/0158812 A1* | 5/2022 | Zhang | H04W 16/10 |
| 2022/0167291 A1* | 5/2022 | Li | H04W 56/0095 |
| 2022/0173784 A1* | 6/2022 | Gao | H04B 7/0691 |
| 2022/0174655 A1* | 6/2022 | Tsai | H04W 48/16 |
| 2022/0240120 A1* | 7/2022 | Fan | H04L 5/0094 |
| 2022/0248383 A1* | 8/2022 | Park | H04W 72/042 |
| 2022/0287066 A1* | 9/2022 | Xiong | H04B 7/063 |
| 2022/0295415 A1* | 9/2022 | MolavianJazi | H04W 52/146 |
| 2022/0295589 A1* | 9/2022 | Tsai | H04B 17/309 |
| 2022/0369124 A1* | 11/2022 | Li | H04W 76/20 |
| 2023/0046727 A1* | 2/2023 | Jung | H04W 72/1268 |
| 2023/0061726 A1* | 3/2023 | Jung | H04L 5/0094 |
| 2023/0239937 A1* | 7/2023 | Müller | H04B 7/022 370/329 |

\* cited by examiner

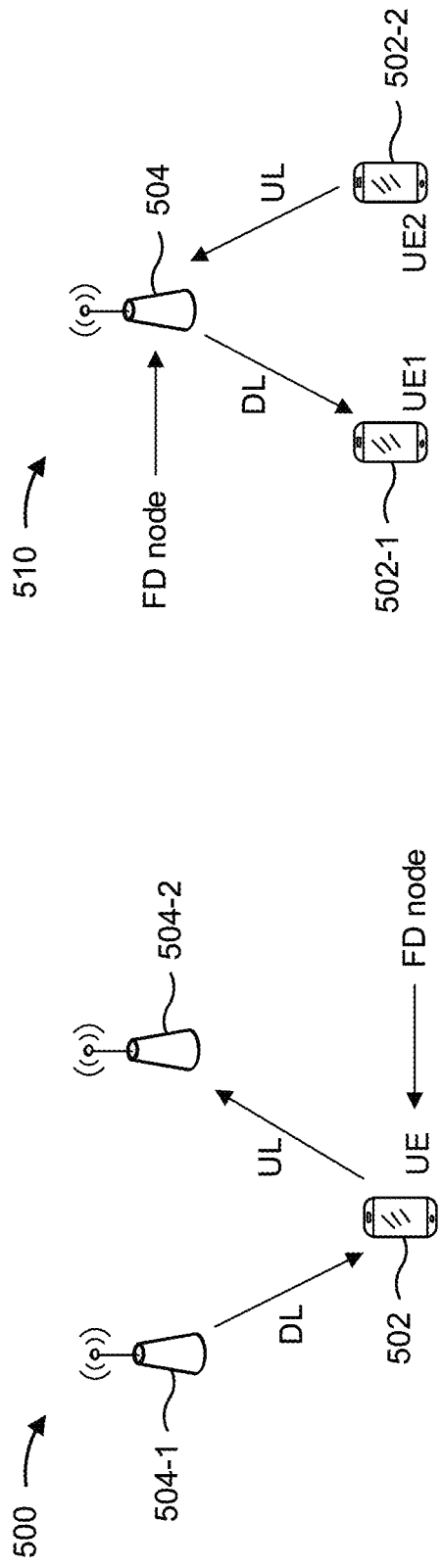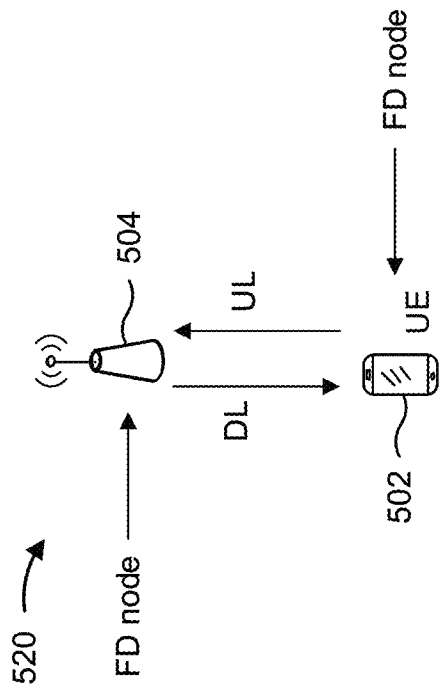

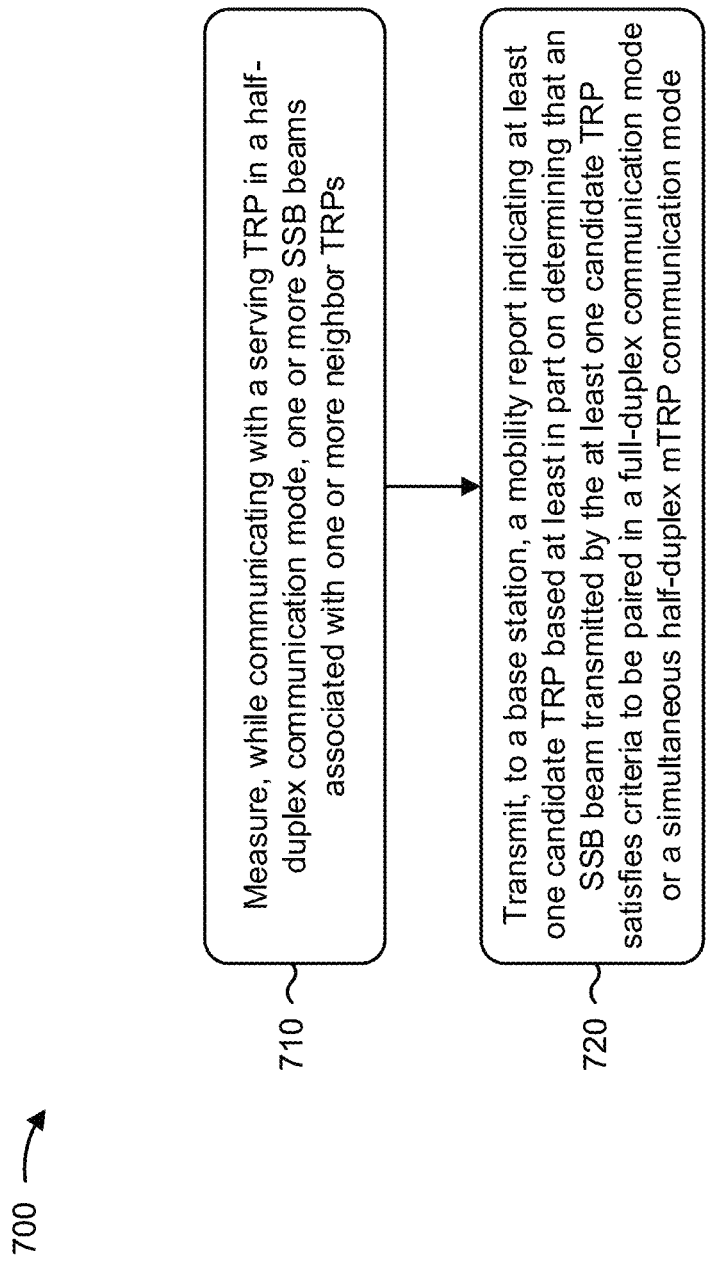

MOBILITY REPORTING FOR FULL-DUPLEX COMMUNICATION OR SIMULTANEOUS HALF-DUPLEX COMMUNICATION WITH MULTIPLE TRANSMIT RECEIVE POINTS

CROSS-REFERENCE TO RELATED APPLICATION

This Patent Application claims priority to U.S. Provisional Patent Application No. 62/705,689, filed on Jul. 10, 2020, entitled "MOBILITY REPORTING FOR FULL-DUPLEX COMMUNICATION OR SIMULTANEOUS HALF-DUPLEX COMMUNICATION WITH MULTIPLE TRANSMIT RECEIVE POINTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses associated with mobility reporting for full-duplex communication or simultaneous half-duplex communication with multiple transmit receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

For example, full-duplex communication may provide improvements in LTE, NR, and other radio access technologies by enabling contemporaneous uplink and downlink communication by a single wireless device using the same resources. Full-duplex communication may provide a reduction in latency, enhanced spectral efficiency per cell or per UE, and more efficient resource utilization. Additionally, or alternatively, spectral efficiency, resource utilization, and/or the like may be improved in a simultaneous half-duplex multi-TRP (mTRP) communication mode in which a UE or another wireless device simultaneously communicates with multiple TRPs on an uplink (e.g., in a simultaneous Tx mode), with multiple TRPs on a downlink (e.g., in a simultaneous Rx mode), and/or the like.

SUMMARY

In some aspects, a method of wireless communication performed by a user equipment (UE) includes: measuring, while communicating with a serving transmit receive point (TRP) in a half-duplex communication mode, one or more synchronization signal block (SSB) beams associated with one or more neighbor TRPs; and transmitting, to a base station, a mobility report indicating at least one candidate TRP based at least in part on determining that an SSB beam transmitted by the at least one candidate TRP satisfies criteria to be paired in a full-duplex communication mode or a simultaneous half-duplex multi-TRP (mTRP) communication mode.

In some aspects, a method of wireless communication performed by a base station includes: receiving, from a UE communicating with a serving TRP in a half-duplex communication mode, a mobility report indicating at least one candidate TRP associated with an SSB beam that satisfies criteria to be paired in a full-duplex communication mode or a simultaneous half-duplex mTRP communication mode; and transmitting, to the UE, configuration information to enable pairing the at least one candidate TRP in the full-duplex communication mode or the simultaneous half-duplex mTRP communication mode.

In some aspects, a UE for wireless communication includes: a memory; and one or more processors, coupled to the memory, configured to: measure, while communicating with a serving TRP in a half-duplex communication mode, one or more SSB beams associated with one or more neighbor TRPs; and transmit, to a base station, a mobility report indicating at least one candidate TRP based at least in part on determining that an SSB beam transmitted by the at least one candidate TRP satisfies criteria to be paired in a full-duplex communication mode or a simultaneous half-duplex mTRP communication mode.

In some aspects, a base station for wireless communication includes: a memory; and one or more processors, coupled to the memory, configured to: receive, from a UE communicating with a serving TRP in a half-duplex communication mode, a mobility report indicating at least one candidate TRP associated with an SSB beam that satisfies criteria to be paired in a full-duplex communication mode or a simultaneous half-duplex mTRP communication mode; and transmit, to the UE, configuration information to enable pairing the at least one candidate TRP in the full-duplex communication mode or the simultaneous half-duplex mTRP communication mode.

In some aspects, a non-transitory computer-readable medium storing one or more instructions for wireless communication includes: one or more instructions that, when executed by one or more processors of a UE, cause the one or more processors to: measure, while communicating with a serving TRP in a half-duplex communication mode, one or more SSB beams associated with one or more neighbor TRPs; and transmit, to a base station, a mobility report indicating at least one candidate TRP based at least in part on determining that an SSB beam transmitted by the at least one candidate TRP satisfies criteria to be paired in a full-duplex communication mode or a simultaneous half-duplex mTRP communication mode.

In some aspects, a non-transitory computer-readable medium storing one or more instructions for wireless communication includes: one or more instructions that, when executed by one or more processors of a base station, cause the one or more processors to: receive, from a UE communicating with a serving TRP in a half-duplex communication mode, a mobility report indicating at least one candidate TRP associated with an SSB beam that satisfies criteria to be paired in a full-duplex communication mode or a simultaneous half-duplex mTRP communication mode; and transmit, to the UE, configuration information to enable pairing the at least one candidate TRP in the full-duplex communication mode or the simultaneous half-duplex mTRP communication mode.

In some aspects, an apparatus for wireless communication includes: means for measuring, while communicating with a serving TRP in a half-duplex communication mode, one or more SSB beams associated with one or more neighbor TRPs; and means for transmitting, to a base station, a mobility report indicating at least one candidate TRP based at least in part on determining that an SSB beam transmitted by the at least one candidate TRP satisfies criteria to be paired in a full-duplex communication mode or a simultaneous half-duplex mTRP communication mode.

In some aspects, an apparatus for wireless communication includes: means for receiving, from a UE communicating with a serving TRP in a half-duplex communication mode, a mobility report indicating at least one candidate TRP associated with an SSB beam that satisfies criteria to be paired in a full-duplex communication mode or a simultaneous half-duplex mTRP communication mode; and means for transmitting, to the UE, configuration information to enable pairing the at least one candidate TRP in the full-duplex communication mode or the simultaneous half-duplex mTRP communication mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5D are diagrams illustrating examples of full-duplex communication, in accordance with the present disclosure.

FIGS. 7-8 are diagrams illustrating example processes associated with mobility reporting for full-duplex communication or simultaneous half-duplex communication with multiple TRPs, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
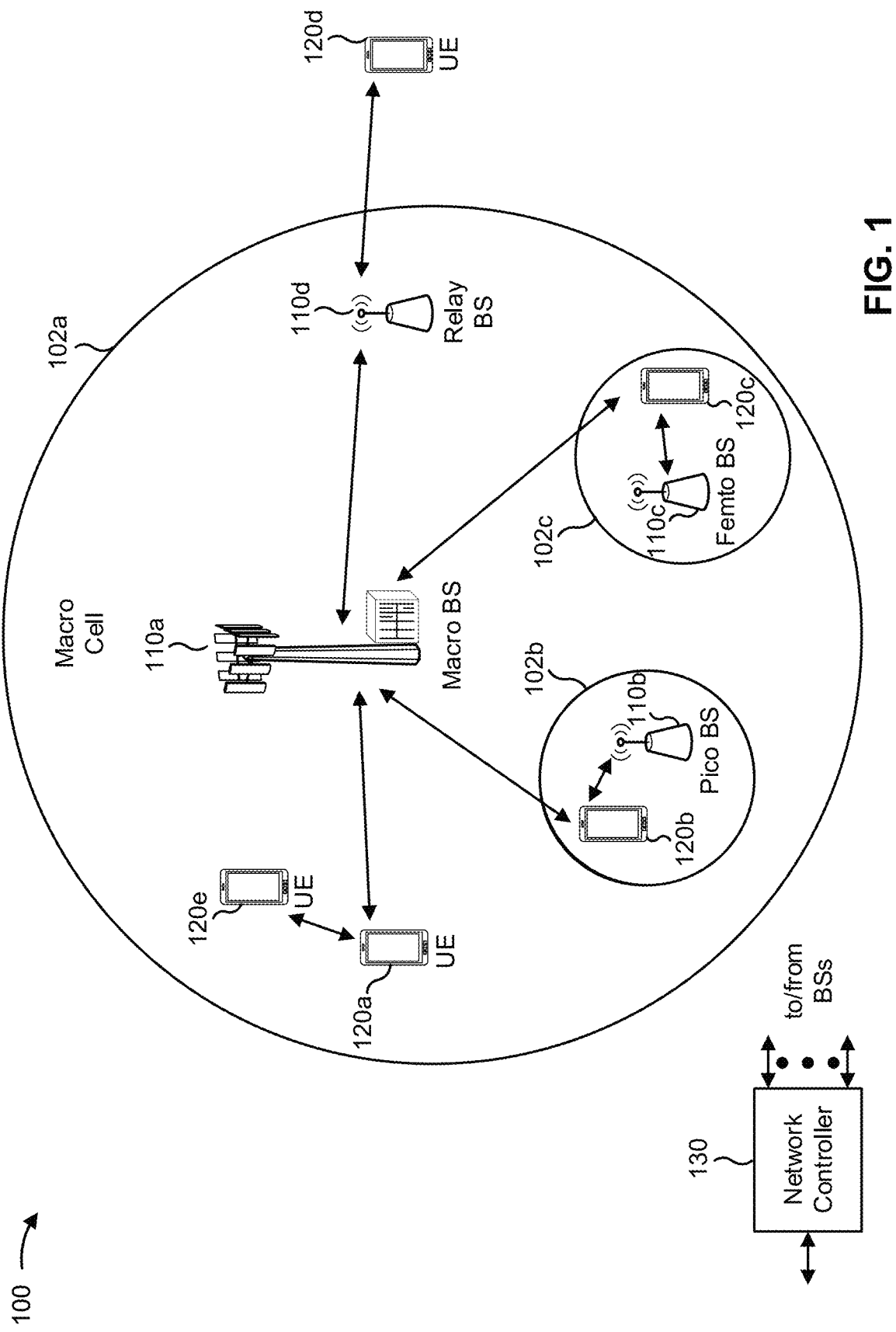
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
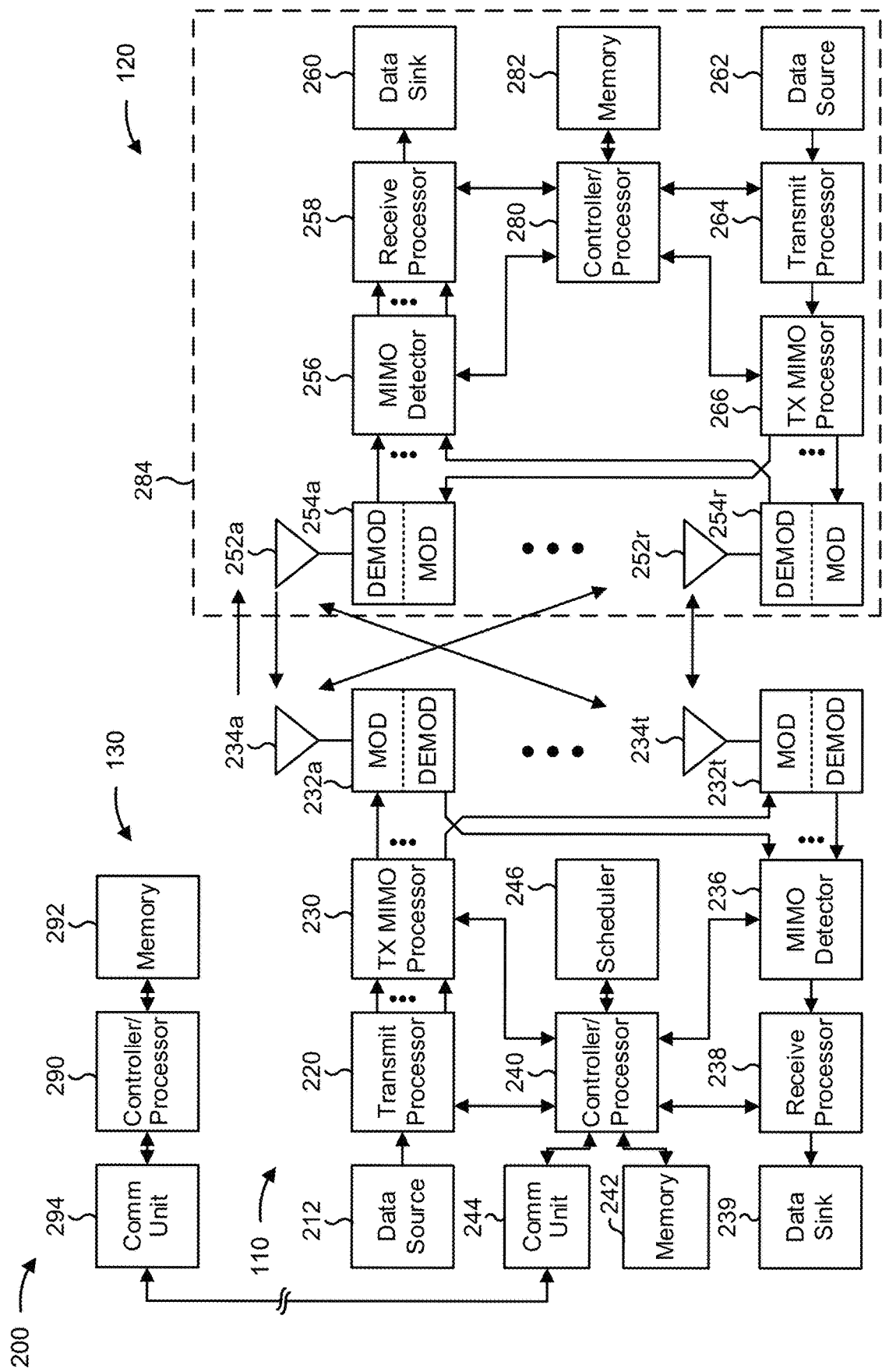
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A-5D, FIGS. 6A-6C, and/or FIGS. 7-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A-5D, FIGS. 6A-6C, and/or FIGS. 7-8).

Controller/processor 240 of base station 110, controller/processor 280 of UE 120, and/or any other component(s) of FIG. 2 may perform one or more techniques associated with mobility reporting for full-duplex communication or simultaneous half-duplex communication with multiple TRPs, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for measuring, while communicating with a serving TRP 110 in a half-duplex communication mode, one or more synchronization signal block (SSB) beams associated with one or more neighbor TRPs 110, means for transmitting, to base station 110, a mobility report indicating at least one candidate TRP 110 based at least in part on determining that an SSB beam transmitted by the at least one candidate TRP 110 satisfies criteria to be paired in a full-duplex communication mode or a simultaneous half-duplex mTRP communication mode, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from UE 120 while the UE 120 is communicating with a serving TRP 110 in a half-duplex communication mode, a mobility report indicating at least one candidate TRP 110 associated with an SSB beam that satisfies criteria to be paired in a full-duplex communication mode or a simultaneous half-duplex mTRP communication mode, means for transmitting, to UE 120, configuration information to enable pairing the at least one candidate TRP 110 in the full-duplex communication mode or the simultaneous half-duplex mTRP communication mode, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
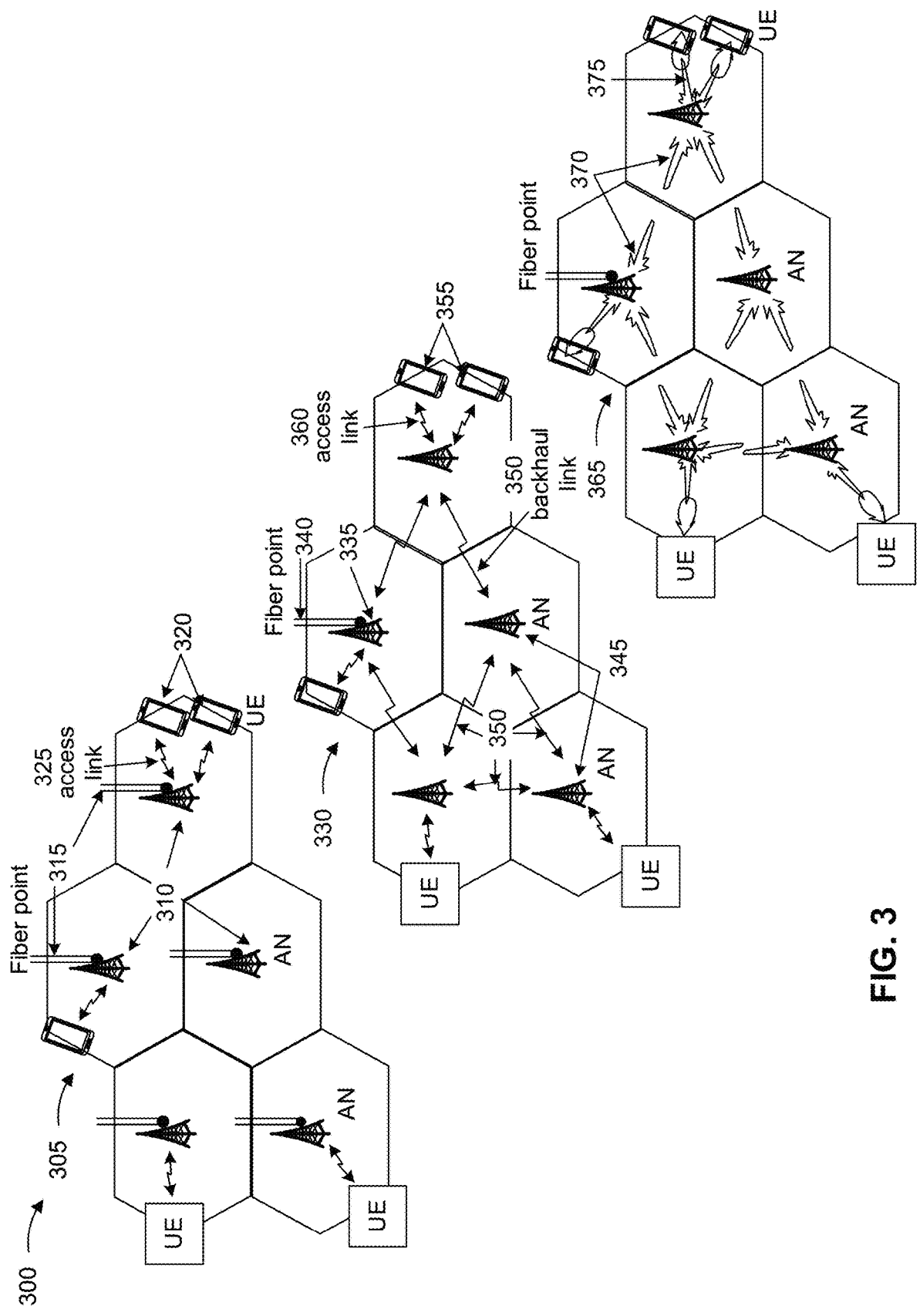
FIG. 3 is a diagram illustrating examples of radio access networks, in accordance with the present disclosure.

FIG. 3 is a diagram illustrating examples 300 of radio access networks, in accordance with the present disclosure.

A traditional (e.g., 3G, 4G, LTE, and/or the like) radio access network 305 may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

A radio access network 330 may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an TAB donor (or IAB-donor). The TAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

In some aspects, a radio access network 365 that includes an TAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, a UE that is directly in communication with a base station (e.g., an anchor base station or a non-anchor base station) may be referred to as an anchor node.

As indicated above, FIG. 3 is provided as an example. Other examples may differ from what is described with regard to FIG. 3.

Figure 4:
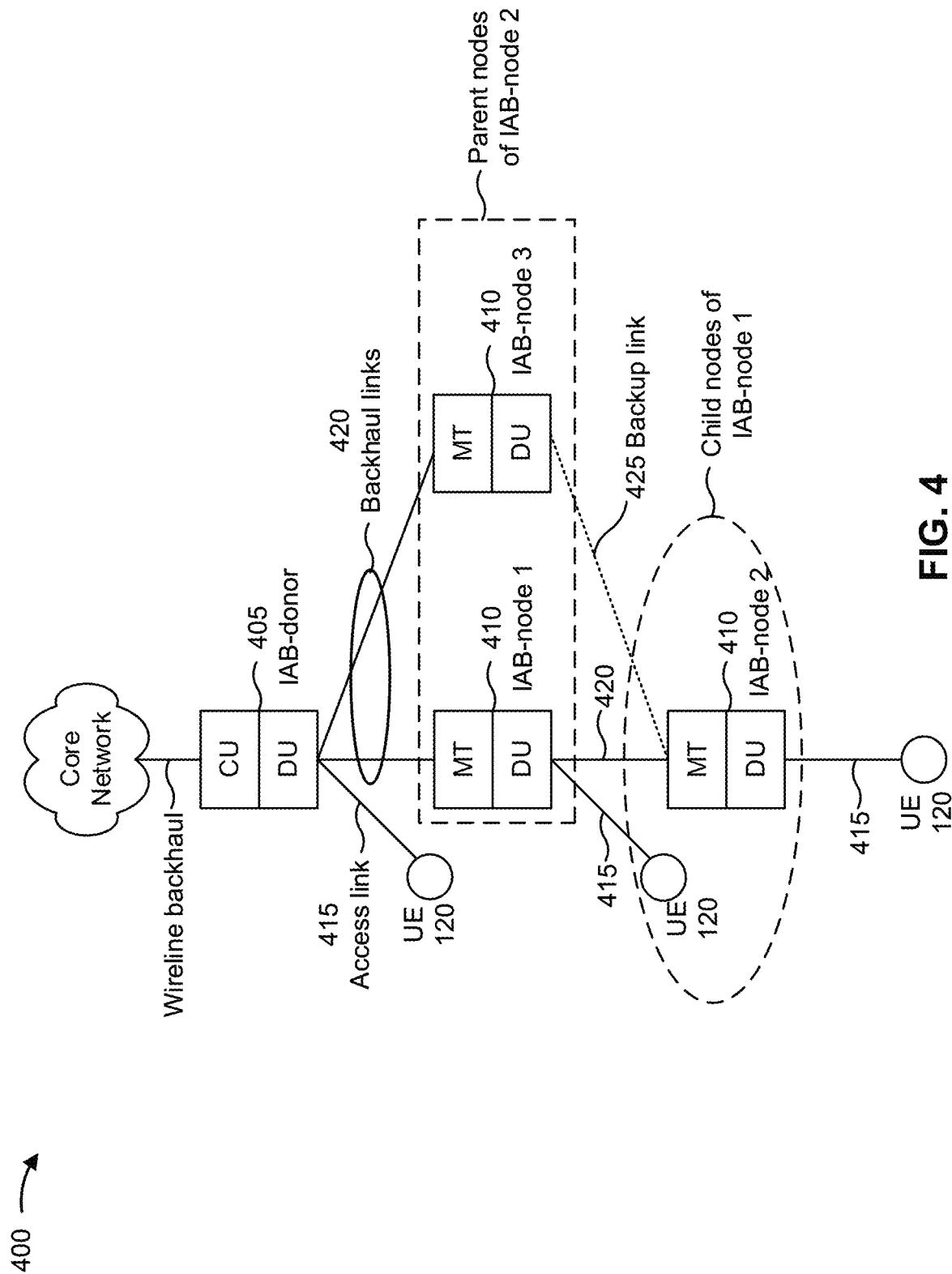
FIG. 4 is a diagram illustrating an example of an integrated access and backhaul network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions, access and mobility management functions, and/or the like. The CU may configure a distributed unit (DU) of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1AP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between an UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, an IAB donor 405 or an IAB node 410 may be referred to as a node or a wireless node.

As indicated above, FIG. 4 is provided as an example. Other examples may differ from what is described with regard to FIG. 4.

FIGS. 5A-5D are diagrams illustrating examples 500, 510, 520, 530 of full-duplex (FD) communication, in accordance with the present disclosure. As shown in FIGS. 5A-5D, examples 500, 510, 520, 530 generally include one or more UEs 502 in communication with one or more base stations 504, TRPs 504, and/or the like in a wireless network that supports full-duplex communication. However, it will be appreciated that the devices shown in FIGS. 5A-5D are exemplary only, and that the wireless network may support full-duplex communication between other devices (e.g., between a mobile termination node and a control node, between an IAB child node and an IAB parent node, between a scheduled node and a scheduling node, and/or the like).

As shown in FIG. 5A, example 500 includes a UE 502 in communication with two base stations (e.g., TRPs) 504-1, 504-2. As shown in FIG. 5A, the UE 502 may transmit one or more uplink transmissions to base station 504-1 and may concurrently receive one or more downlink transmissions from base station 504-2. Accordingly, in the example 500 shown in FIG. 5A, full-duplex communication is enabled for the UE 502, which may be operating as a full-duplex node, but not for the base stations 504-1, 504-2, which may be operating as half-duplex nodes. Additionally, or alternatively, as shown in FIG. 5B, example 510 includes two UEs, UE1 502-1 and UE2 502-2 in communication with a base station 504. In this case, the base station 504 may transmit one or more downlink transmissions to the UE1 502-1 and may concurrently receive one or more uplink transmissions from the UE2 502-2. Accordingly, in the example 510 shown in FIG. 5B, full-duplex communication is enabled for the base station 504, which may be operating as a full-duplex node, but not for the UE1 502-1 and UE2 502-2, which may be operating as half-duplex nodes. Additionally, or alternatively, as shown in FIG. 5C, example 520 includes a UE 502 in communication with a base station 504. In this case, the base station 504 may transmit, and the UE 502 may receive, one or more downlink transmissions concurrently with the UE 502 transmitting, and the base station 504 receiving, one or more uplink transmissions. Accordingly, in the example 520 shown in FIG. 5C, full-duplex communication is enabled for both the UE 502 and the base station 504, each of which is operating as a full-duplex node.

Figure 5D:
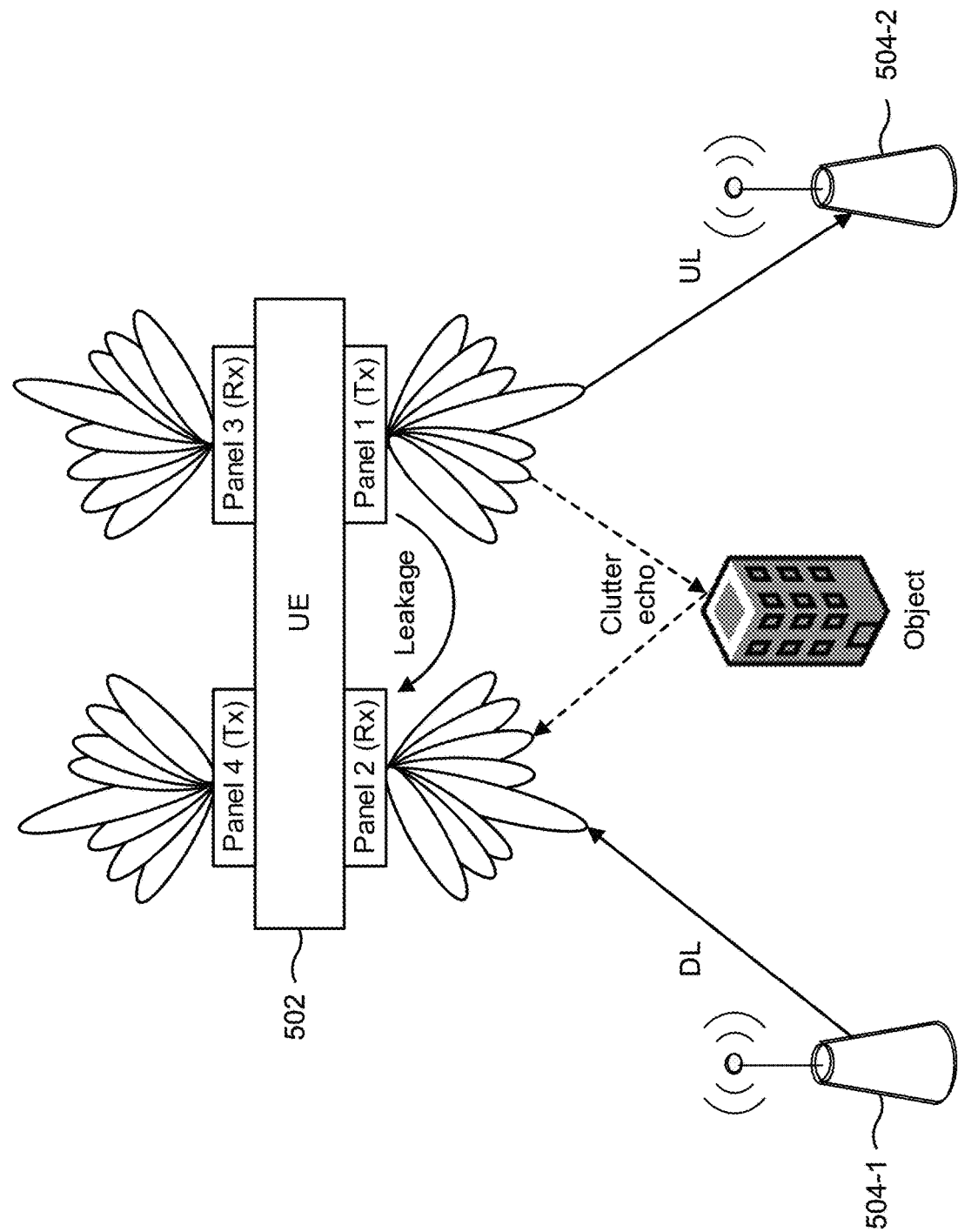

The present disclosure generally relates to improving a manner in which flexible time-division duplexing (TDD) operates to support full-duplex communication, which generally refers to simultaneous uplink and downlink transmissions in Frequency Range 2 (FR2), in wireless networks that support beamformed communication, and/or the like. In some aspects, flexible TDD capabilities that support full-duplex communication may be present at a scheduling node (e.g., a base station, a TRP, a control node, a parent node, and/or the like), a scheduled node (e.g., a UE, an MT node, a child node, and/or the like), or both. For example, at a UE, uplink transmission may be from one antenna panel and downlink reception may be in another antenna panel. For example, as shown in FIG. 5D, a UE 502 that supports full-duplex communication may include multiple antenna panels (e.g., antenna arrays and/or the like), and each antenna panel may be associated with one or more beam groups that can be used for uplink communication or for downlink communication. For example, in FIG. 5D, the UE 502 has four antenna panels that are associated with respective beam groups (e.g., a first panel may be associated with beams that are indexed 1-8, a second panel may be associated with beams that are indexed 9-16, a third panel may be associated with beams that are indexed 17-24, and a fourth panel may be associated with beams that are indexed 25-32). Furthermore, when full-duplex communication is enabled at the UE 502, one or more antenna panels (e.g., the first and fourth panels) may be configured for uplink transmission to one or more TRPs, and one or more antenna panels (e.g., the second and third panels) may be configured for downlink reception from one or more TRPs.

In general, full-duplex communication may be conditional on a beam separation of an uplink beam and a downlink beam at the respective antenna panels. Accordingly, improving the manner in which the uplink beam and the downlink beam are selected to enable full-duplex communication is desirable. Utilizing full-duplex communication may provide reduced latency by allowing a full-duplex node to transmit or receive a downlink signal in an uplink-only slot, or to transmit or receive an uplink signal in a downlink-only slot, which may enable latency savings. In addition, full-duplex communication may enhance spectral efficiency or throughput per cell or per UE, may enable more efficient resource utilization by simultaneously utilizing time and frequency resources for uplink and downlink communication, and/or the like. However, as described above, full-duplex communication may be dependent on sufficient spatial separation between uplink and downlink beams, to assist in limiting or reducing self-interference that may occur during full-duplex communication. In other words, full-duplex communication may be restricted from using certain uplink and downlink beam pairs that may result in self-interference. If a UE and a base station are unable to identify any uplink and downlink beam pair(s) that can provide sufficient spatial separation, the UE and the base station may be unable to support full-duplex communication. For example, in some cases, an uplink and downlink beam pair may not provide sufficient spatial separation if the uplink beam causes self-interference with respect to the downlink beam, which may occur when a transmitted signal leaks into a receive port (e.g., shown in FIG. 5D as leakage from the first panel configured for uplink transmission into the second panel configured for downlink reception). Additionally, or alternatively, self-interference may occur when an object reflects a transmitted signal back to a receive port (e.g., causing a clutter echo effect). For example, as shown in FIG. 5D, a signal transmitted by the first antenna panel toward node 504-2 may reflect off a reflecting (clutter echo-causing) object and into the second antenna panel, which may cause interference with a downlink signal transmitted from node 504-1 toward the second antenna panel. Accordingly, whether full-duplex communication can be performed may be dependent on selecting suitable uplink and downlink beam pairs (e.g., transmit and receive beams that are on different antenna panels) to reduce or minimize self-interference (especially clutter echo) via spatial isolation. In some aspects, determining the uplink and downlink beams that are separated on respective antenna panels may provide a reliable full-duplex communication by selecting beam pairs that minimize or reduce self-interference.

Accordingly, measuring self-interference at a wireless node having full-duplex capabilities may assist in determining uplink and downlink beam pairs that may support full-duplex communication. For example, a UE, an IAB child node, and/or the like may obtain self-interference measurements to determine one or more candidate uplink transmit beams that can be paired with one or more candidate downlink receive beams. Additionally, or alternatively, a base station, an IAB parent node, and/or the like may obtain self-interference measurements to determine one or more candidate uplink receive beams that can be paired with one or more candidate downlink transmit beams. In general, to obtain the self-interference measurements, a wireless node with full-duplex capabilities may transmit a signal from a first set of antennas in one or more transmit beam directions, and the wireless node may concurrently measure a received signal (e.g., a reflected or leaked transmit signal) on a second set of antennas in one or more receive beam directions, where the first set of antennas may be different from or the same as the second set of antennas.

Accordingly, although full-duplex communication may enable latency savings, enhance spectral efficiency or throughput per cell or per UE, enable more efficient resource utilization, and/or the like, there are various circumstances in which a UE may be unable to establish full-duplex communications. For example, a UE with full-duplex capabilities may be unable to establish full-duplex communications in cases where the UE is communicating with a serving base station or a serving TRP that lacks full-duplex capabilities, in cases where a downlink beam and an uplink beam are associated with the same antenna panel, in cases where there is insufficient separation between a downlink beam and an uplink beam (e.g., due to leakage, clutter echo, and/or the like causing more than a threshold level of self-interference at the UE or the serving base station or serving TRP), and/or the like. However, in a wireless network that includes geographically dispersed base stations, TRPs, and/or the like, a mobile UE communicating with a serving base station or a serving TRP may change locations and come under the coverage of one or more neighbor base stations and/or neighbor TRPs that can be paired (e.g., with each other, or with the serving base station or serving TRP) in a full-duplex communication mode. Additionally, or alternatively, the mobile UE may come under the coverage of one or more neighbor base stations and/or neighbor TRPs that can be paired (e.g., with each other, or with the serving base station or serving TRP) in a simultaneous half-duplex multi-TRP (mTRP) communication mode. For example, in a simultaneous half-duplex mTRP communication mode, a UE may be configured to simultaneously communicate uplink transmissions to different TRPs or simultaneously receive downlink transmissions from different TRPs to improve reliability, increase throughput, and/or the like.

However, existing wireless networks generally limit mobility reporting to cell switching scenarios. For example, in a cell switching scenario, a UE may transmit a mobility report to a base station in cases where an SSB beam transmitted by one or more neighbor base stations or neighbor TRPs are associated with an RSRP measurement that satisfies a cell-specific threshold related to cell switching. For example, the cell-specific threshold may be satisfied in cases where the RSRP measurement associated with the SSB beam from the neighbor base station or neighbor TRP has a higher absolute value than an RSRP measurement associated with an SSB beam from the serving base station or serving TRP, where the RSRP measurement associated with the SSB beam from the neighbor base station or neighbor TRP is higher than the RSRP measurement associated with an SSB beam from the serving base station or serving TRP by a relative value (e.g., higher than the RSRP value of the serving TRP by +X dB), and/or the like. However, in cases where the neighbor base station or neighbor TRP may be suitable for pairing in a full-duplex communication mode or a simultaneous half-duplex mTRP communication, a purpose and one or more criteria for triggering transmission of a mobility report should reflect the conditions of enabling full-duplex or simultaneous half-duplex mTRP communication. For example, performance, efficiency, latency, utilization, and/or the like may be improved by enabling a UE to switch from communicating with a serving base station or TRP to communicating with multiple base stations or TRPs that are paired in a full-duplex or simultaneous half-duplex mTRP mode even if the RSRP measurements associated with the neighbor base stations fail to satisfy the cell-specific threshold related to cell switching.

Some aspects described herein relate to techniques and apparatuses associated with mobility reporting for full-duplex communication or simultaneous half-duplex communication with multiple TRPs (also referred to as multi-TRP (mTRP) communication and/or the like). For example, while a UE is communicating with a serving TRP in a half-duplex communication mode (e.g., downlink only or uplink only), the UE may periodically measure SSB beams transmitted by one or more neighbor TRPs. Accordingly, in cases where the UE detects a neighbor TRP that can be paired with the serving TRP in a full-duplex communication mode or a simultaneous half-duplex mTRP communication mode, the UE may transmit a mobility report to a base station to indicate the neighbor TRP for the purpose of pairing the neighbor TRP with the serving TRP in the full-duplex communication mode or the simultaneous half-duplex mTRP communication mode. Additionally, or alternatively, in cases where the UE detects a pair of neighbor TRPs that can be paired with each other in the full-duplex communication mode or the simultaneous half-duplex mTRP communication mode, the UE may transmit a mobility report to a base station to indicate the neighbor TRP pair for the purpose of pairing the neighbor TRPs with each other in the full-duplex communication mode or the simultaneous half-duplex mTRP communication mode. In some aspects, as described herein, the UE may transmit the mobility report based at least in part on detecting that the neighbor TRP(s) satisfy criteria that are specific to pairing TRPs in the full-duplex communication mode or the simultaneous half-duplex mTRP communication mode. For example, in some aspects, the UE may be configured with one or more thresholds that are relaxed with respect to a cell switching threshold to trigger transmission of the mobility report and enable pairing TRPs in the full-duplex communication mode or the simultaneous half-duplex mTRP communication mode. Additionally, or alternatively, a neighbor TRP may satisfy criteria to be paired in the full-duplex communication mode when beams associated with the neighbor TRP and the serving TRP are associated with different panels of the UE. In this way, a UE may transmit a mobility report to indicate when one or more neighbor TRPs satisfy criteria to be paired in the full-duplex communication mode or the simultaneous half-duplex mTRP communication mode, which may improve performance, efficiency, latency, utilization, and/or the like by enabling the UE to simultaneously transmit on an uplink to paired TRPs, simultaneously receive on a downlink from paired TRPs, or simultaneously transmit on an uplink to a first TRP while receiving on a downlink from a second TRP paired with the first TRP.

As indicated above, FIGS. 5A-5D are provided as one or more examples. Other examples may differ from what is described with regard to FIGS. 5A-5D.

Figure 6A:
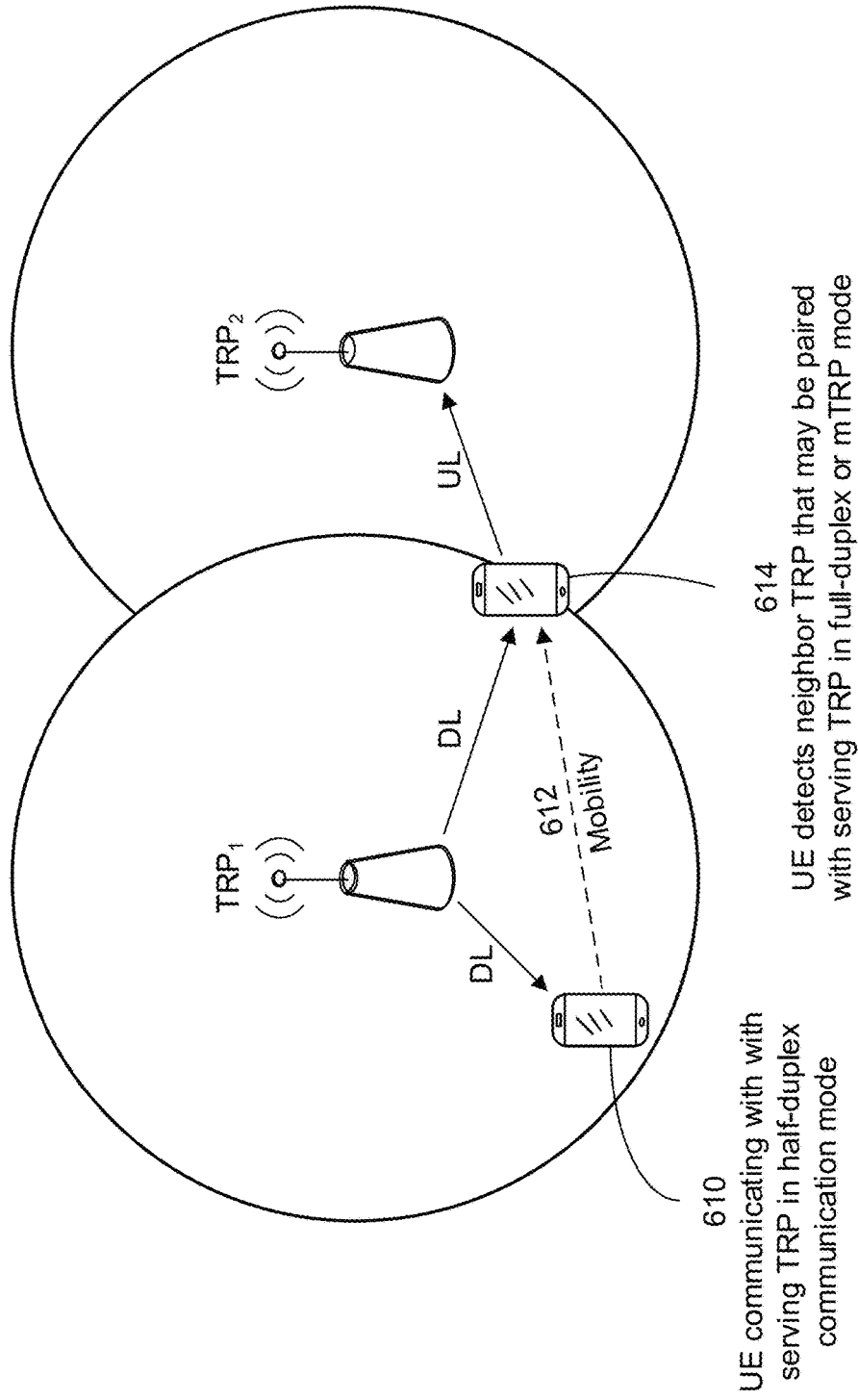
FIGS. 6A-6C are diagrams illustrating one or more examples associated with mobility reporting for full-duplex communication or simultaneous half-duplex communication with multiple transmit receive points (TRPs), in accordance with the present disclosure.
Figure 6B:
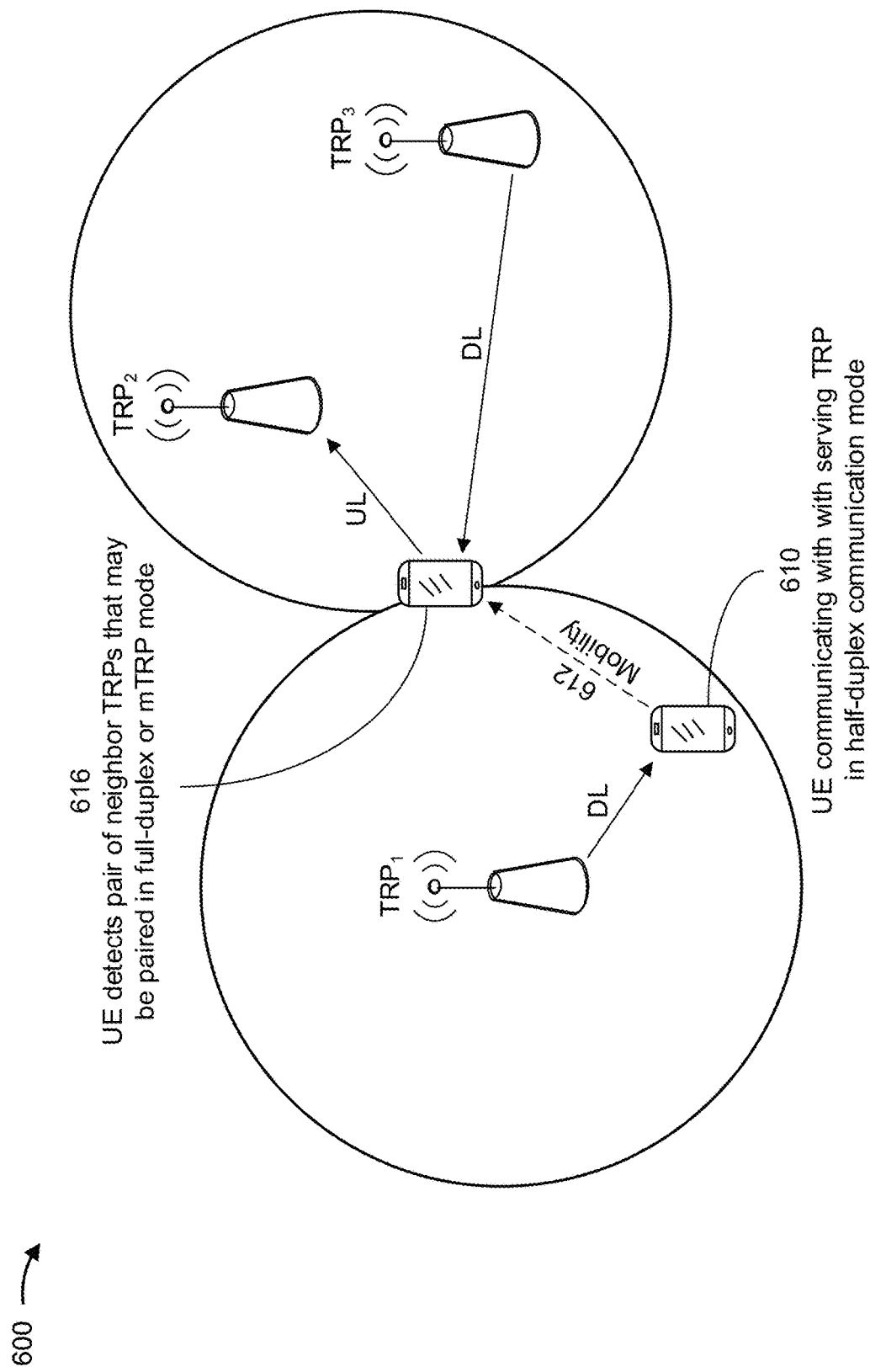
Figure 6C:
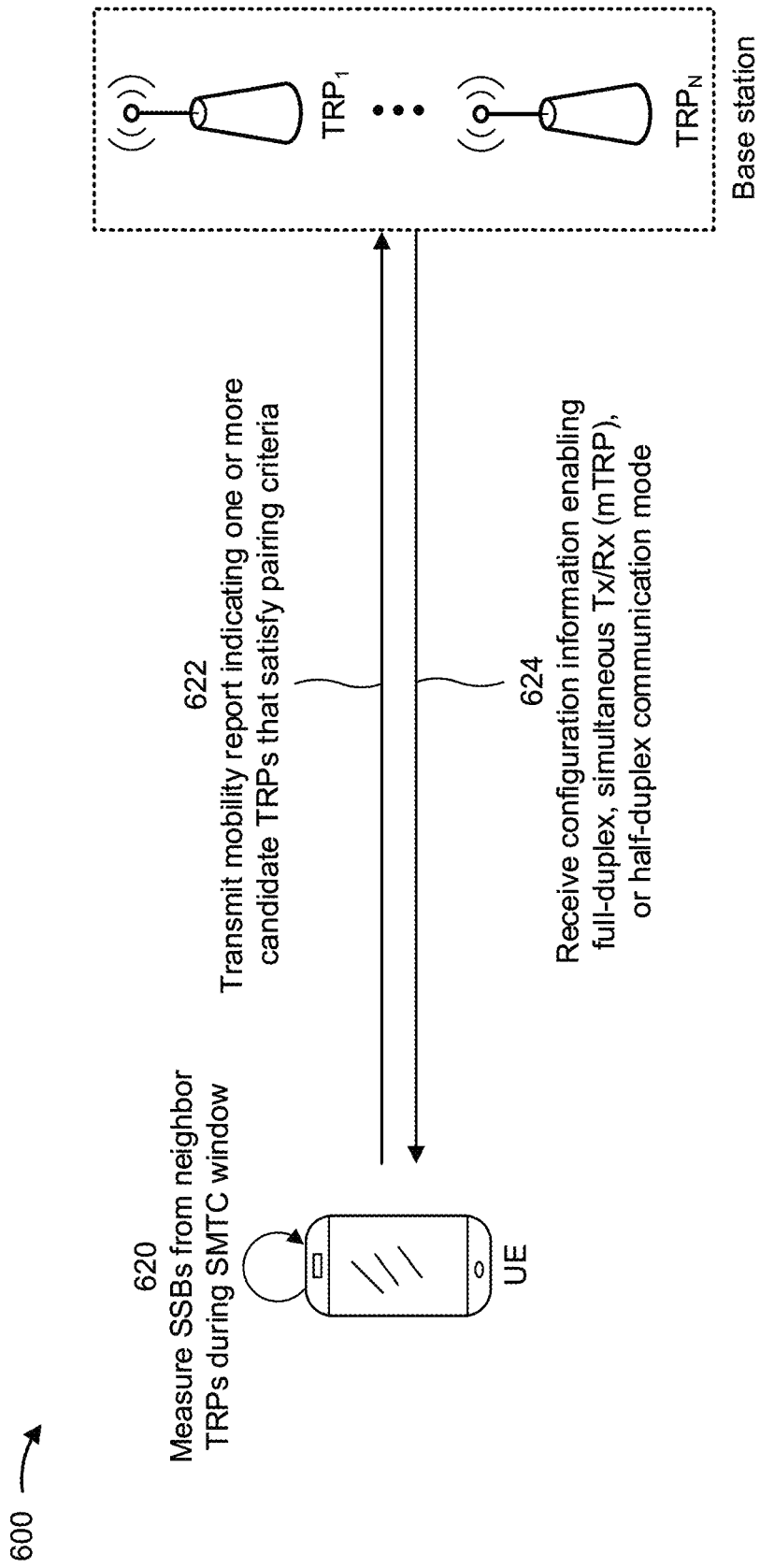

FIGS. 6A-6C are diagrams illustrating one or more examples 600 associated with mobility reporting for full-duplex communication or simultaneous half-duplex communication with multiple TRPs, in accordance with the present disclosure. As shown in FIGS. 6A-6C, example(s) 600 includes a UE (e.g., UE 120, UE 320, UE 355, UE 502, and/or the like) that may communicate with one or more TRPs in a wireless network (e.g., wireless network 100, radio access network 305, 330, 365, and/or the like). Furthermore, as shown in FIGS. 6A-6C, the one or more TRPs may be associated with a base station (e.g., base station 110, base station 310, base station 335, base station 345, base station 504, and/or the like). For example, different TRPs may be associated with the same serving cell and different physical cell identifiers (PCIs), or different TRPs may be associated with different serving cells and different PCIs under control of the same base station.

Although some aspects are described herein in relation to a UE communicating with one or more base stations or TRPs, in some cases, similar techniques may be applied for other devices that can simultaneously communicate with a pair of devices on an uplink and a downlink or simultaneously communicate with a pair of devices on an uplink or a downlink. For example, in some aspects, operations described herein as being performed by a UE may additionally, or alternatively, be performed by an MT node, a child node, a scheduled node, and/or the like, and operations described herein as being performed by a base station or a TRP may additionally, or alternatively, be performed by a control node, a parent node, a scheduling node, and/or the like.

As shown in FIG. 6A and FIG. 6B, and by reference number 610, the UE may communicate with a serving TRP (shown as $TRP_1$) associated with a first PCI in a half-duplex communication mode. For example, in FIG. 6A and FIG. 6B, the UE is communicating with the serving TRP in a half-duplex mode. In some cases, the UE and the serving TRP may communicate in the half-duplex communication mode because the serving TRP lacks full-duplex communication capabilities, because the UE is unable to determine a downlink beam and an uplink beam that are associated with different antenna panels, because all candidate downlink and uplink beam pairs are associated with self-interference that exceeds a threshold, and/or the like.

As further shown in FIG. 6A and FIG. 6B, and by reference number 612, the UE may be associated with a mobility event in which the UE changes locations within the wireless network. For example, the UE may move toward the coverage of one or more neighbor TRPs (shown as $TRP_2$, $TRP_3$, $TRP_N$, and/or the like). For example, the one or more neighbor TRPs may be associated with different PCIs in the same cell as the serving TRP, different PCIs in different serving cells than the serving TRP, and/or the like. In general, as described herein, the neighbor TRP(s) and the serving TRP may be associated with or otherwise under control of the same base station. Accordingly, in some aspects, the UE may transmit a mobility report to the base station to request that the base station enable a full-duplex communication mode or a simultaneous half-duplex mTRP communication mode in cases where the neighbor TRP(s) satisfy one or more criteria related to pairing in the full-duplex communication mode or the simultaneous half-duplex mTRP communication mode.

For example, as shown in FIG. 6A, and by reference number 614, the UE may detect a neighbor TRP that may be paired with the serving TRP in the full-duplex communication mode or the simultaneous half-duplex mTRP communication mode (e.g., based on an SSB beam transmitted by the neighbor TRP being associated with a different panel than a beam used for half-duplex communication with the serving TRP, based on the SSB beam transmitted by the neighbor TRP satisfying one or more cell-specific or PCI-specific thresholds that relate to switching from the half-duplex communication mode to the full-duplex communication mode or the simultaneous half-duplex mTRP communication mode, and/or the like. Additionally, or alternatively, as shown in FIG. 6B, and by reference number 616, the UE may detect a pair of neighbor TRPs that may be paired with each other in the full-duplex communication mode or the simultaneous half-duplex mTRP communication mode. For example, in some aspects, the pair of neighbor TRPs may satisfy criteria to be paired with each other in cases where a first SSB beam transmitted by a first neighbor TRP and a second SSB beam transmitted by a second neighbor TRP are associated with different panels. Additionally, or alternatively, the SSB beams transmitted by the pair of neighbor TRPs may each be associated with RSRP measurements that exceed an RSRP measurement of the serving TRP, or one or more of the neighbor TRPs may be associated with an SSB beam that has a lower RSRP measurement than the serving TRP but is associated with a different panel than the serving TRP.

Accordingly, as described herein, FIG. 6A and FIG. 6B illustrate example mobility scenarios where a UE communicating with a serving TRP in a half-duplex communication mode (e.g., downlink-only or uplink-only) may detect one or more neighbor TRPs that satisfy criteria to be paired in a full-duplex communication mode or a simultaneous half-duplex mTRP mode. As described in further detail below with reference to FIG. 6C, the UE may transmit a mobility report to a base station that controls the serving TRP and/or the neighbor TRP(s) that satisfy the criteria to be paired in the full-duplex communication mode or the simultaneous half-duplex mTRP mode. For example, as described herein, the UE may transmit the mobility report for the purpose of requesting a switch from the half-duplex communication mode to the full-duplex communication mode or the simultaneous half-duplex mTRP mode, which may enable improved performance, throughput, latency, efficiency, resource utilization, and/or the like. Furthermore, as described in further detail below with reference to FIG. 6C, transmission of the mobility report may be triggered according to one or more criteria that are based at least in part on specific conditions that relate to enabling the full-duplex communication mode or the simultaneous half-duplex mTRP mode.

As shown in FIG. 6C, and by reference number 620, the UE may measure SSB beams transmitted by one or more neighbor TRPs during an SSB measurement timing configuration (SMTC) window. For example, in some aspects, the UE may measure an RSRP associated with the SSB beams transmitted by the neighbor TRP(s), and the UE may further determine an antenna panel of the UE that is associated with each SSB beam. Accordingly, as described herein, the UE may determine whether the neighbor TRP(s) satisfy one or more criteria to be paired in the full-duplex communication mode or the simultaneous half-duplex mTRP mode based at least in part on the RSRP measurements associated with the SSB beams transmitted by the neighbor TRP(s), the antenna panels associated with each SSB beam, and/or the like.

As further shown in FIG. 6C, and by reference number 622, the UE may transmit, and the base station may receive, a mobility report indicating one or more candidate TRPs that satisfy criteria to be paired in the full-duplex communication mode or the simultaneous half-duplex mTRP mode. For example, in cases where the UE detects a single candidate TRP, the candidate TRP may satisfy the criteria to be paired with the serving TRP in the full-duplex communication mode or the simultaneous half-duplex mTRP mode in cases where an SSB beam transmitted by the candidate TRP is associated with a different panel than the UE is using to communicate with the serving TRP. Additionally, or alternatively, the candidate TRP may satisfy the criteria to be paired with the serving TRP in the full-duplex communication mode or the simultaneous half-duplex mTRP mode in cases where an RSRP measurement associated with the SSB beam transmitted by the candidate TRP satisfies one or more thresholds.

For example, in some aspects, the UE may be configured with at least a first cell-specific threshold related to cell switching (referred to herein as a cell switching threshold) and a second cell-specific threshold related to pairing a TRP in the full-duplex communication mode or the simultaneous half-duplex mTRP mode (referred to herein as a TRP pairing threshold). In general, the cell switching threshold may be configured as a relative higher value with respect to an RSRP measurement associated with an SSB beam transmitted by the serving TRP. For example, the UE may be triggered to transmit a mobility report to indicate a candidate TRP in cases where the SSB beam transmitted by the candidate TRP has an RSRP measurement that exceeds an RSRP measurement associated with the serving TRP by the cell switching threshold (e.g., higher than the RSRP measurement of the serving cell by +X dB). Additionally, or alternatively, the cell switching threshold may be an absolute threshold, whereby the UE may be triggered to transmit a mobility report to indicate a candidate TRP in cases where the SSB beam transmitted by the candidate TRP has an RSRP measurement that is higher than an RSRP measurement associated with the serving TRP. In general, the cell switching threshold may be configured to require that the RSRP measurement of the candidate TRP is generally higher than the serving TRP to ensure that the UE does not experience performance loss by switching to the candidate TRP. However, for the purpose of enabling full-duplex or simultaneous half-duplex mTRP communications, the UE may experience improved performance even if a signal strength from the candidate TRP is weaker than the serving TRP.

Accordingly, in some aspects, the second (TRP pairing) threshold may be associated with relaxed criteria relative to the cell switching threshold to trigger transmission of a mobility report in cases where one or more candidate TRPs may be paired in the full-duplex communication mode or the simultaneous half-duplex mTRP communication mode. For example, the TRP pairing threshold may be defined as a negative value relative to the RSRP measurement of the serving TRP. In this case, when the RSRP measurement associated with the candidate TRP is greater than or equal to −Y dB relative to the RSRP measurement associated with the serving TRP, the TRP pairing threshold may be satisfied and the UE may be configured to transmit the mobility report to indicate that the candidate TRP may be paired with the serving TRP in the full-duplex communication mode or the simultaneous half-duplex mTRP communication mode. Additionally, or alternatively, the TRP pairing threshold may be an absolute RSRP threshold that has a lower value than the cell switching threshold. In this way, the UE may be triggered to transmit the mobility report for the purpose of requesting a switch from the half-duplex communication to the full-duplex communication mode or the simultaneous half-duplex mTRP communication mode in cases where the RSRP measurement associated with the candidate TRP may otherwise fail to satisfy the cell switching threshold. In this way, opportunities for the UE to enable the full-duplex communication mode or the simultaneous half-duplex mTRP communication mode may be increased, which may improve performance, throughput, latency, efficiency, resource utilization, and/or the like.

In some aspects, the reporting criteria described above, which are based at least in part on two cell-specific thresholds (e.g., the TRP pairing threshold and the relatively higher cell switching threshold), may be applied only in cases where the one or more candidate TRPs detected by the UE are included in a list of neighbor TRPs configured for the UE. However, in some cases, the UE may come under the coverage of a candidate TRP that does not appear in the list of neighbor TRPs configured for the UE. Accordingly, in such cases, the UE may be configured to determine whether to trigger the mobility report to indicate the candidate TRP(s) based on other rules. For example, in some aspects, the UE may transmit the mobility report based at least in part on the RSRP measurement(s) associated with the SSB beam(s) transmitted by the candidate TRP(s) satisfying the (higher) cell switching threshold. Additionally, or alternatively, the UE may transmit the mobility report based at least in part on the candidate TRP(s) indicating a capability to support the full-duplex communication mode and/or simultaneous half-duplex communication mode.

In some aspects, in cases where the UE detects a pair of candidate TRPs that may be paired with one another in the full-duplex communication mode and/or simultaneous half-duplex mTRP communication mode, the UE may generally apply the same or similar criteria as described above with respect to the case where the UE detects a single candidate TRP that may be paired with the serving TRP. For example, in some aspects, the UE may be configured with two cell-specific thresholds, one for cell switching and one for TRP pairing, and may transmit the mobility report to indicate the pair of candidate TRPs in cases where SSB beams associated with the pair of candidate TRPs are associated with different panels and RSRP measurements associated with both candidate TRPs satisfy the TRP pairing threshold and/or the cell switching threshold. Additionally, or alternatively, the UE may transmit the mobility report in cases where the SSB beams associated with the pair of candidate TRPs are associated with different panels and RSRP measurements associated with both candidate TRPs are higher than an RSRP measurement associated with the serving TRP. Additionally, or alternatively, the UE may transmit the mobility report in cases where a first RSRP measurement associated with a first candidate TRP is higher than the RSRP measurement associated with the serving TRP, and an SSB beam associated with a second candidate TRP is from a different panel than the first candidate TRP even if a second RSRP measurement associated with the second candidate TRP is slightly lower than the serving TRP. In this way, the mobility report may be triggered when the pair of candidate TRPs both satisfy the TRP pairing threshold (e.g., via beams from different panels of the UE) and the pair of candidate TRPs are otherwise suitable to be paired in the full-duplex communication mode or the simultaneous half-duplex mTRP communication mode.

As further shown in FIG. 6C, and by reference number 624, the base station may transmit, and the UE may receive, configuration information enabling the full-duplex communication, the simultaneous mTRP communication mode (e.g., simultaneous uplink transmission to paired TRPs or simultaneous downlink reception from paired TRPs), or indicating that the UE is to remain in the half-duplex communication mode with the serving TRP. For example, in some aspects, the mobility report transmitted by the UE may include assistance information to enable the base station to determine the appropriate communication mode to enable for the UE. For example, in some aspects, the mobility report may indicate an identifier associated with the SSB beam transmitted by each candidate TRP that satisfies the full-duplex and/or mTRP pairing criteria, and a corresponding RSRP measurement associated with the respective SSB beam.

Furthermore, in some aspects, the assistance information included in the mobility report may indicate a recommended communication direction for the candidate TRP(s). For example, when indicating a candidate TRP to be paired with the serving TRP in the full-duplex communication mode, the assistance information may include a recommendation to use a first SSB beam associated with the serving TRP as an uplink beam and a second SSB beam associated with the candidate TRP as a downlink beam, or vice versa. Additionally, or alternatively, when indicating a pair of candidate TRPs to be paired with each other in the full-duplex communication mode, the assistance information may include a recommendation to use a first SSB beam associated with a first candidate TRP as an uplink beam and a second SSB beam associated with a second candidate TRP as a downlink beam, or vice versa.

For example, in some aspects, the UE may determine the recommended communication directions based at least in part on a maximum permissible exposure (MPE) constraint, which is typically a regulatory requirement defined in terms of aggregate exposure over a certain amount of time. For example, when the UE is communicating using radio access technologies that operate in a frequency range below 6 GHz, the applicable MPE parameter is a specific absorption rate (SAR), which refers to a rate at which the human body absorbs energy when exposed to radio frequency (RF) energy (e.g., power absorbed per unit of mass, which may be expressed according to watts per kilogram (W/kg)). In particular, SAR requirements generally specify that overall radiated power by a UE is to remain under a certain level to limit heating that may occur when RF energy is absorbed. In another example, when the UE is communicating using a radio access technology that operates in a high frequency range, such as a millimeter wave (mmW) frequency range, the applicable MPE parameter is power density, which may be regulated to limit heating of the UE and/or nearby surfaces. Accordingly, if a particular beam associated with one TRP is blocked by a user's finger or other body part, the UE may recommend using that TRP for a downlink and using the other TRP for uplink transmissions. Additionally, or alternatively, the UE may determine the recommended communication directions based at least in part on a thermal balancing condition associated with the UE. For example, because transmitting generally consumes more power (and therefore generates more heat) than receiving, the UE may recommend using a first TRP for a downlink and a second TRP for an uplink in cases where an antenna panel associated with the beam directed towards the first TRP is hotter than an antenna panel associated with the beam directed towards the second TRP.

Furthermore, in some aspects, the assistance information included in the mobility report may include a pair of signal-to-interference-plus-noise ratios (SINRs) and/or CQIs that are based on different combinations of TRP pairings. For example, in the case of a mobility report indicating a candidate TRP that satisfies criteria to be paired with the serving TRP, the assistance information may include a first SINR or CQI that is calculated based on using a first SSB beam of the serving TRP as a downlink beam and a second SSB beam of the candidate TRP as an uplink beam. Furthermore, the assistance information may include a second SINR or CQI that is calculated based on using the first SSB beam of the serving TRP as the uplink beam and the second SSB beam of the candidate TRP as the downlink beam. Similarly, in the case of a mobility report indicating a pair of candidate TRPs that satisfy criteria to be paired with each other, the assistance information may include a first SINR or CQI that is calculated based on using a first SSB beam of a first candidate TRP as a downlink beam and a second SSB beam of a second candidate TRP as an uplink beam, and the assistance information may include a second SINR or CQI that is calculated based on using the first SSB beam of the first candidate TRP as the uplink beam and the second SSB beam of the second candidate TRP as the downlink beam.

In this case, to enable the UE to calculate the SINR or CQI for each TRP pairing, the base station may transmit, to the UE, information to configure one or more channel measurement resources (CMRs) and one or more interference measurement resources (IMRs). Accordingly, for a candidate TRP to be paired with the serving TRP, the base station may configure the candidate TRP to sweep through a set of N candidate SSB beams, channel state information reference signal (CSI-RS) beams, and/or the like, and may configure the serving TRP to sweep through a set of active SSB beams, a set of active CSI-RS beams, and/or the like. In this way, a particular SINR or CQI may be determined by measuring a CMR associated with downlink transmissions by a first TRP and measuring an IMR associated with interference that downlink transmissions by a second TRP cause with respect to reception of the downlink transmissions by a first TRP. Furthermore, in the case of full-duplex communications, the SINR or CQI may be determined by further measuring a second IMR for uplink transmissions by the UE that cause self-interference with respect to reception of the downlink transmissions by the first TRP. Accordingly, for full-duplex communications, the UE may report one or more downlink and uplink beam pairs that satisfy criteria for pairing in the full-duplex communication mode (e.g., downlink and uplink beam pairs that are associated with different panels and have SINR values, CQI values, self-interference measurements, and/or the like that satisfy a threshold), and the UE may further report indexes associated with the corresponding TRPs to enable the base station to select a final downlink and uplink beam pair with corresponding TRP indexes to enable the full-duplex communication mode with a pair of TRPs.

Furthermore, in some aspects, the assistance information included in the mobility report may include a pair of power headroom values that are available for uplink transmissions to different TRPs. For example, in the case of a mobility report indicating a candidate TRP that satisfies criteria to be paired with the serving TRP, the assistance information may include a first power headroom value that is based on using a first SSB beam of the serving TRP as an uplink beam and a second power headroom value that is based on using a second SSB beam of the candidate TRP as an uplink beam. Similarly, in the case of a mobility report indicating a pair of candidate TRPs that satisfy criteria to be paired with each other, the assistance information may include a first power headroom value that is based on using a first SSB beam of a first candidate TRP as an uplink beam and a second power headroom value that is based on using a second SSB beam of a second candidate TRP as an uplink beam. Furthermore, in some aspects, the pair of power headroom values may be included as assistance information in cases where the mobility report is transmitted to initiate the full-duplex communication mode or an mTRP communication mode with simultaneous uplink transmission to different TRPs. However, the mobility report may omit the power headroom values in cases where the mobility report is transmitted to initiate simultaneous downlink transmission from different TRPs, as the power headroom values are generally applicable to transmissions only. Furthermore, in some aspects, each power headroom value may be limited or otherwise constrained by a self-interference measurement. For example, a maximum uplink transmit power in a certain beam direction may be reduced or limited by self-interference (e.g., the UE may be required to transmit at less than full power to avoid causing more than a threshold level of self-interference with downlink reception).

Accordingly, as described herein, the mobility report that the UE provides to the base station may include various sources of information to enable the base station to determine the best communication mode to enable for the UE. For example, the base station may consider the RSRP measurements associated with the serving TRP and/or the candidate TRPs, the recommended communication directions for the serving TRP and/or the candidate TRPs, the SINR or CQI values associated with different combinations of TRP pairings, the power headroom values associated with using different TRPs for uplink transmissions, and/or the like to determine whether to enable the full-duplex communication mode, simultaneous transmission and/or reception in the mTRP communication mode, or the half-duplex communication mode. Furthermore, in some aspects, the base station may configure the serving TRP and/or the candidate TRPs to perform self-interference measurements for one or more communication modes, may determine one or more network parameters such as loading, and/or the like, in order to determine the best communication mode to enable for the UE.

As indicated above, FIGS. 6A-6D are provided as one or more examples. Other examples may differ from what is described with respect to FIGS. 6A-6D.

FIG. 7 is a diagram illustrating an example process 700 performed, for example, by a UE, in accordance with the present disclosure. Example process 700 is an example where the UE (e.g., UE 120, UE 320, UE 355, UE 502, and/or the like) performs operations associated with mobility reporting for full-duplex communication or simultaneous half-duplex communication with multiple TRPs.

As shown in FIG. 7, in some aspects, process 700 may include measuring, while communicating with a serving TRP in a half-duplex communication mode, one or more SSB beams associated with one or more neighbor TRPs (block 710). For example, the UE (e.g., using receive processor 258, transmit processor 264, controller/processor 280, memory 282, and/or the like) may measure, while communicating with a serving TRP in a half-duplex communication mode, one or more SSB beams associated with one or more neighbor TRPs, as described above.

As further shown in FIG. 7, in some aspects, process 700 may include transmitting, to a base station, a mobility report indicating at least one candidate TRP based at least in part on determining that an SSB beam transmitted by the at least one candidate TRP satisfies criteria to be paired in a full-duplex communication mode or a simultaneous half-duplex mTRP communication mode (block 720). For example, the UE (e.g., using receive processor 258, transmit processor 264, controller/processor 280, memory 282, and/or the like) may transmit, to a base station, a mobility report indicating at least one candidate TRP based at least in part on determining that an SSB beam transmitted by the at least one candidate TRP satisfies criteria to be paired in a full-duplex communication mode or a simultaneous half-duplex mTRP communication mode, as described above.

Process 700 may include additional aspects, such as any single aspect or any combination of aspects described below and/or in connection with one or more other processes described elsewhere herein.

In a first aspect, the mobility report indicates that the at least one candidate TRP satisfies the criteria to be paired with the serving TRP in the full-duplex communication mode or the simultaneous half-duplex mTRP communication mode.

In a second aspect, alone or in combination with the first aspect, the at least one candidate TRP includes a first candidate TRP and a second candidate TRP that satisfy the criteria to be paired with one another in the full-duplex communication mode or the simultaneous half-duplex mTRP communication mode.

In a third aspect, alone or in combination with one or more of the first and second aspects, the first candidate TRP and the second candidate TRP transmit respective SSB beams that are associated with RSRP measurements that are higher than an RSRP measurement associated with an SSB beam transmitted by the serving TRP.

In a fourth aspect, alone or in combination with one or more of the first through third aspects, one or more of the first candidate TRP or the second candidate TRP transmit an SSB beam that is associated with a different panel of the UE than an SSB beam transmitted by the serving TRP.

In a fifth aspect, alone or in combination with one or more of the first through fourth aspects, process 700 includes switching from a cell associated with the serving TRP to one or more cells associated with the first candidate TRP and the second candidate TRP that satisfy the criteria to be paired with one another in the full-duplex communication mode or the simultaneous half-duplex mTRP communication mode.

In a sixth aspect, alone or in combination with one or more of the first through fifth aspects, the at least one candidate TRP is indicated by the mobility report based at least in part on an RSRP measurement associated with the SSB beam transmitted by the at least one candidate TRP satisfying a first threshold that has a negative value relative to an RSRP measurement associated with an SSB beam transmitted by the serving TRP or a second threshold, related to cell switching, that has a higher value relative to the RSRP measurement associated with the SSB beam transmitted by the serving TRP.

In a seventh aspect, alone or in combination with one or more of the first through sixth aspects, the at least one candidate TRP is indicated by the mobility report based at least in part on an RSRP measurement associated with the SSB beam transmitted by the at least one candidate TRP satisfying a first threshold that has a lower absolute value than a second threshold related to cell switching.

In an eighth aspect, alone or in combination with one or more of the first through seventh aspects, the at least one candidate TRP is indicated by the mobility report based at least in part on an RSRP measurement associated with the SSB beam transmitted by the at least one candidate TRP satisfying a threshold related to cell switching.

In a ninth aspect, alone or in combination with one or more of the first through eighth aspects, the at least one candidate TRP is indicated by the mobility report based at least in part on the at least one candidate TRP indicating a capability to support the full-duplex or mTRP communication mode.

In a tenth aspect, alone or in combination with one or more of the first through ninth aspects, the at least one candidate TRP is indicated by the mobility report based at least in part on the SSB beam transmitted by the at least one candidate TRP being associated with a different panel of the UE than an SSB beam transmitted by the serving TRP.

In an eleventh aspect, alone or in combination with one or more of the first through tenth aspects, the mobility report further indicates a recommended communication direction for the at least one candidate TRP.

In a twelfth aspect, alone or in combination with one or more of the first through eleventh aspects, the recommended communication direction for the at least one candidate TRP is based at least in part on an MPE constraint or a thermal balancing condition associated with the UE.

In a thirteenth aspect, alone or in combination with one or more of the first through twelfth aspects, the mobility report further indicates a first SINR or CQI associated with using a first SSB beam of the at least one candidate TRP as an uplink beam and a second SSB beam as a downlink beam, where the first SINR or CQI is based at least in part on a first self-interference measurement from the first SSB beam to the second SSB beam, and the mobility report further indicates a second SINR or CQI associated with using the first SSB beam of the at least one candidate TRP as the downlink beam and the second SSB beam as the uplink beam, where the second SINR or CQI is based at least in part on a second self-interference measurement from the second SSB beam to the first SSB beam, In a fourteenth aspect, alone or in combination with one or more of the first through thirteenth aspects, the mobility report further indicates a first power headroom associated with using a first SSB beam of the at least one candidate TRP as an uplink beam and a second SSB beam as a downlink beam, and the mobility report further indicates a second power headroom associated with using the second SSB beam as the uplink beam and the first SSB beam of the at least one candidate TRP as the downlink beam.

In a fifteenth aspect, alone or in combination with one or more of the first through fourteenth aspects, the first power headroom and the second power headroom are based at least in part on a maximum uplink transmit power limited by one or more self-interference measurements associated with transmitting from the uplink beam to the downlink beam.

In a sixteenth aspect, alone or in combination with one or more of the first through fifteenth aspects, process 700 includes receiving, from the base station, information configuring one or more CMRs and one or more self-interference measurement resources based at least in part on the mobility report indicating that the at least one candidate TRP satisfies criteria to be paired in the full-duplex communication mode, transmitting, to the base station, one or more candidate downlink and uplink beam pairs to be paired in the full-duplex communication mode based at least in part on measurements of the one or more CMRs and the one or more self-interference measurement resources, and receiving, from the base station, a final downlink and uplink beam pair to be used for paired TRPs that include the at least one candidate TRP and the serving TRP or another candidate TRP in the full-duplex communication mode.

In a seventeenth aspect, alone or in combination with one or more of the first through sixteenth aspects, the mobility report further indicates an identifier associated with the SSB beam transmitted by the at least one candidate TRP and a corresponding RSRP measurement associated with the SSB beam.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
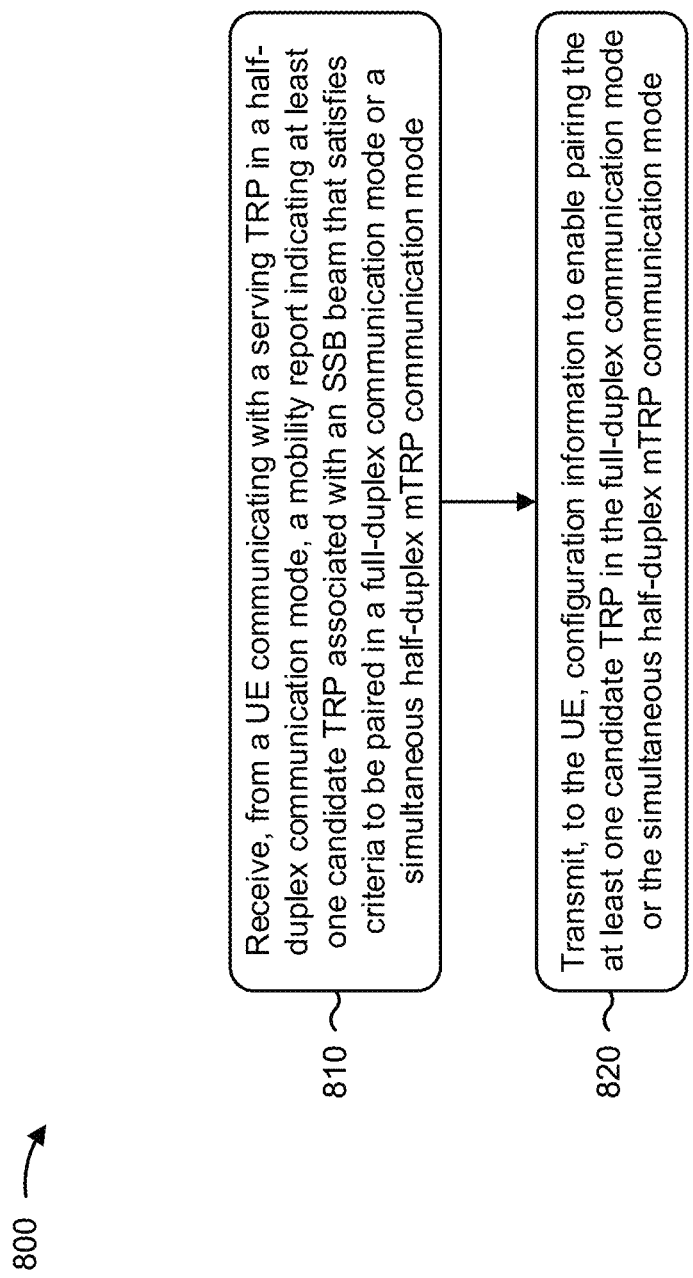

FIG. 8 is a diagram illustrating an example process 800 performed, for example, by a base station, in accordance with the present disclosure. Example process 800 is an example where the base station (e.g., base station 110, base station 310, base station 335, base station 345, base station 504, and/or the like) performs operations associated with mobility reporting for full-duplex communication or simultaneous half-duplex communication with multiple TRPs.

As shown in FIG. 8, in some aspects, process 800 may include receiving, from a UE communicating with a serving TRP in a half-duplex communication mode, a mobility report indicating at least one candidate TRP associated with an SSB beam that satisfies criteria to be paired in a full-duplex communication mode or a simultaneous half-duplex mTRP communication mode (block 810). For example, the base station (e.g., using transmit processor 220, receive processor 238, controller/processor 240, memory 242, and/or the like) may receive, from a UE communicating with a serving TRP in a half-duplex communication mode, a mobility report indicating at least one candidate TRP associated with an SSB beam that satisfies criteria to be paired in a full-duplex communication mode or a simultaneous half-duplex mTRP communication mode, as described above.

As further shown in FIG. 8, in some aspects, process 800 may include transmitting, to the UE, configuration information to enable pairing the at least one candidate TRP in the full-duplex communication mode or the simultaneous half-duplex mTRP communication mode (block 820). For example, the base station (e.g., using transmit processor 220, receive processor 238, controller/processor 240, memory 242, and/or the like) may transmit, to the UE, configuration information to enable pairing the at least one candidate TRP in the full-duplex communication mode or the simultaneous half-duplex mTRP communication mode, as described above.

Process 800 may include additional aspects, such as any single aspect or any combination of aspects described below and/or in connection with one or more other processes described elsewhere herein.

In a first aspect, the mobility report indicates that the at least one candidate TRP satisfies the criteria to be paired with the serving TRP in the full-duplex communication mode or the simultaneous half-duplex mTRP communication mode.

In a second aspect, alone or in combination with the first aspect, the at least one candidate TRP includes a first candidate TRP and a second candidate TRP that satisfy the criteria to be paired with one another in the full-duplex communication mode or the simultaneous half-duplex mTRP communication mode.

In a third aspect, alone or in combination with one or more of the first and second aspects, the first candidate TRP and the second candidate TRP transmit respective SSB beams that are associated with RSRP measurements that are higher than an RSRP measurement associated with an SSB beam transmitted by the serving TRP.

In a fourth aspect, alone or in combination with one or more of the first through third aspects, one or more of the first candidate TRP or the second candidate TRP transmit an SSB beam that is associated with a different panel of the UE than an SSB beam transmitted by the serving TRP.

In a fifth aspect, alone or in combination with one or more of the first through fourth aspects, the configuration information transmitted to the UE causes the UE to switch from a cell associated with the serving TRP to one or more cells associated with the first candidate TRP and the second candidate TRP that satisfy the criteria to be paired with one another in the full-duplex communication mode or the simultaneous half-duplex mTRP communication mode.

In a sixth aspect, alone or in combination with one or more of the first through fifth aspects, the at least one candidate TRP is indicated by the mobility report based at least in part on an RSRP measurement associated with the SSB transmitted by the at least one candidate TRP satisfying a first threshold that has a negative value relative to an RSRP measurement associated with an SSB beam transmitted by the serving TRP or a second threshold, related to cell switching, that has a higher value relative to the RSRP measurement associated with the SSB beam transmitted by the serving TRP.

In a seventh aspect, alone or in combination with one or more of the first through sixth aspects, the at least one candidate TRP is indicated by the mobility report based at least in part on an RSRP measurement associated with the SSB beam transmitted by the at least one candidate TRP satisfying a first threshold that has a lower absolute value than a second threshold related to cell switching.

In an eighth aspect, alone or in combination with one or more of the first through seventh aspects, the at least one candidate TRP is indicated by the mobility report based at least in part on an RSRP associated with the SSB beam transmitted by the at least one candidate TRP satisfying a threshold related to cell switching.

In a ninth aspect, alone or in combination with one or more of the first through eighth aspects, the at least one candidate TRP is indicated by the mobility report based at least in part on the at least one candidate TRP indicating a capability to support the full-duplex or mTRP communication mode.

In a tenth aspect, alone or in combination with one or more of the first through ninth aspects, the at least one candidate TRP is indicated by the mobility report based at least in part on an SSB beam transmitted by the at least one candidate TRP being associated with a different panel of the UE than an SSB beam transmitted by the serving TRP.

In an eleventh aspect, alone or in combination with one or more of the first through tenth aspects, the mobility report further indicates a recommended communication direction for the at least one candidate TRP.

In a twelfth aspect, alone or in combination with one or more of the first through eleventh aspects, the recommended communication direction for the at least one candidate TRP is based at least in part on an MPE constraint or a thermal balancing condition associated with the UE.

In a thirteenth aspect, alone or in combination with one or more of the first through twelfth aspects, the mobility report further indicates a first SINR or CQI associated with using a first SSB beam of the at least one candidate TRP as an uplink beam and a second SSB beam as a downlink beam, and the mobility report further indicates a second SINR or CQI associated with using the first SSB beam of the at least one candidate TRP as the downlink beam and the second SSB beam as the uplink beam.

In a fourteenth aspect, alone or in combination with one or more of the first through thirteenth aspects, the mobility report further indicates a first power headroom associated with using a first SSB beam of the at least one candidate TRP as an uplink beam and a second SSB beam as a downlink beam, and the mobility report further indicates a second power headroom associated with using the second SSB beam as the uplink beam and the first SSB beam of the at least one candidate TRP as the downlink beam.

In a fifteenth aspect, alone or in combination with one or more of the first through fourteenth aspects, the first power headroom and the second power headroom are based at least in part on a maximum uplink transmit power limited by one or more self-interference measurements associated with the UE.

In a sixteenth aspect, alone or in combination with one or more of the first through fifteenth aspects, process 800 includes transmitting, to the UE, information configuring one or more CMRs and one or more self-interference measurement resources based at least in part on the mobility report indicating that the at least one candidate TRP satisfies criteria to be paired in the full-duplex communication mode, receiving, from the UE, one or more candidate downlink and uplink beam pairs to be paired in the full-duplex communication mode based at least in part on measurements of the one or more CMRs and the one or more self-interference measurement resources, and transmitting, to the UE, a final downlink and uplink beam pair to be used for paired TRPs that include the at least one candidate TRP and the serving TRP or another candidate TRP in the full-duplex communication mode.

In a seventeenth aspect, alone or in combination with one or more of the first through sixteenth aspects, the mobility report further indicates an identifier associated with the SSB beam transmitted by the at least one candidate TRP and a corresponding RSRP measurement associated with the SSB beam.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a UE, comprising: measuring, while communicating with a serving TRP in a half-duplex communication mode, one or more SSB beams associated with one or more neighbor TRPs; and transmitting, to a base station, a mobility report indicating at least one candidate TRP based at least in part on determining that an SSB beam transmitted by the at least one candidate TRP satisfies criteria to be paired in a full-duplex communication mode or a simultaneous half-duplex mTRP communication mode.

Aspect 2: The method of Aspect 1, wherein the mobility report indicates that the at least one candidate TRP satisfies the criteria to be paired with the serving TRP in the full-duplex communication mode or the simultaneous half-duplex mTRP communication mode.

Aspect 3: The method of any of Aspects 1-2, wherein the at least one candidate TRP includes a first candidate TRP and a second candidate TRP that satisfy the criteria to be paired with one another in the full-duplex communication mode or the simultaneous half-duplex mTRP communication mode.

Aspect 4: The method of Aspect 3, wherein the first candidate TRP and the second candidate TRP transmit respective SSB beams that are associated with RSRP measurements that are higher than an RSRP measurement associated with an SSB beam transmitted by the serving TRP.

Aspect 5: The method of any of Aspects 3-4, wherein the first candidate TRP and the second candidate TRP transmit an SSB beam that are associated with two different panels of the UE.

Aspect 6: The method of any of Aspects 3-5, further comprising: switching from a cell associated with the serving TRP to one or more cells associated with the first candidate TRP and the second candidate TRP that satisfy the criteria to be paired with one another in the full-duplex communication mode or the simultaneous half-duplex mTRP communication mode.

Aspect 7: The method of any of Aspects 1-6, wherein the at least one candidate TRP is indicated by the mobility report based at least in part on an RSRP measurement associated with the SSB beam transmitted by the at least one candidate TRP satisfying a first threshold that has a negative value relative to an RSRP measurement associated with an SSB beam transmitted by the serving TRP or a second threshold, related to cell switching, that has a higher value relative to the RSRP measurement associated with the SSB beam transmitted by the serving TRP.

Aspect 8: The method of any of Aspects 1-6, wherein the at least one candidate TRP is indicated by the mobility report based at least in part on an RSRP measurement associated with the SSB beam transmitted by the at least one candidate TRP satisfying a first threshold that has a lower absolute value than a second threshold related to cell switching.

Aspect 9: The method of any of Aspects 1-6, wherein the at least one candidate TRP is indicated by the mobility report based at least in part on an RSRP measurement associated with the SSB beam transmitted by the at least one candidate TRP satisfying a threshold related to cell switching if no indication of any capability to support the full-duplex or mTRP communication mode.

Aspect 10: The method of any of Aspects 1-9, wherein the at least one candidate TRP is indicated by the mobility report based at least in part on the at least one candidate TRP indicating a capability to support the full-duplex or mTRP communication mode.

Aspect 11: The method of any of Aspects 1-10, wherein the at least one candidate TRP is indicated by the mobility report based at least in part on the SSB beam transmitted by the at least one candidate TRP being associated with a different panel of the UE than an SSB beam transmitted by the serving TRP.

Aspect 12: The method of any of Aspects 1-11, wherein the mobility report further indicates a recommended communication direction for the at least one candidate TRP.

Aspect 13: The method of Aspect 12, wherein the recommended communication direction for the at least one candidate TRP is based at least in part on an MPRE constraint or a thermal balancing condition associated with the UE.

Aspect 14: The method of any of Aspects 1-13, wherein the mobility report further indicates a first SINR or CQI associated with using a first SSB beam of the at least one candidate TRP as an uplink beam and a second SSB beam as a downlink beam, wherein the first SINR or CQI is based at least in part on a first self-interference measurement from the first SSB beam to the second SSB beam, wherein the mobility report further indicates a second SINR or CQI associated with using the first SSB beam of the at least one candidate TRP as the downlink beam and the second SSB beam as the uplink beam, and wherein the second SINR or CQI is based at least in part on a second self-interference measurement from the second SSB beam to the first SSB beam.

Aspect 15: The method of any of Aspects 1-14, wherein the mobility report further indicates a first power headroom associated with using a first SSB beam of the at least one candidate TRP as an uplink beam and a second SSB beam as a downlink beam, and wherein the mobility report further indicates a second power headroom associated with using the second SSB beam as the uplink beam and the first SSB beam of the at least one candidate TRP as the downlink beam.

Aspect 16: The method of Aspect 15, wherein the first power headroom and the second power headroom are based at least in part on a maximum uplink transmit power limited by one or more self-interference measurements associated with transmitting from the uplink beam to the downlink beam.

Aspect 17: The method of any of Aspects 1-16, further comprising: receiving, from the base station, information configuring one or more CMRs and one or more self-interference measurement resources based at least in part on the mobility report indicating that the at least one candidate TRP satisfies criteria to be paired in the full-duplex communication mode; transmitting, to the base station, one or more candidate downlink and uplink beam pairs to be paired in the full-duplex communication mode based at least in part on measurements of the one or more CMRs and the one or more self-interference measurement resources; and receiving, from the base station, a final downlink and uplink beam pair to be used for paired TRPs that include the at least one candidate TRP and the serving TRP or another candidate TRP in the full-duplex communication mode.

Aspect 18: The method of any of Aspects 1-17, wherein the mobility report further indicates an identifier associated with the SSB beam transmitted by the at least one candidate TRP and a corresponding RSRP measurement associated with the SSB beam.

Aspect 19: A method of wireless communication performed by a base station, comprising: receiving, from a UE communicating with a serving TRP in a half-duplex communication mode, a mobility report indicating at least one candidate TRP associated with an SSB beam that satisfies criteria to be paired in a full-duplex communication mode or a simultaneous half-duplex mTRP communication mode; and transmitting, to the UE, configuration information to enable pairing the at least one candidate TRP in the full-duplex communication mode or the simultaneous half-duplex mTRP communication mode.

Aspect 20: The method of Aspect 19, wherein the mobility report indicates that the at least one candidate TRP satisfies the criteria to be paired with the serving TRP in the full-duplex communication mode or the simultaneous half-duplex mTRP communication mode.

Aspect 21: The method of any of Aspects 19-20, wherein the at least one candidate TRP includes a first candidate TRP and a second candidate TRP that satisfy the criteria to be paired with one another in the full-duplex communication mode or the simultaneous half-duplex mTRP communication mode.

Aspect 22: The method of Aspect 21, wherein the first candidate TRP and the second candidate TRP transmit respective SSB beams that are associated with RSRP measurements that are higher than an RSRP measurement associated with an SSB beam transmitted by the serving TRP.

Aspect 23: The method of any of Aspects 21-22, wherein one or more of the first candidate TRP or the second candidate TRP transmit an SSB beam that is associated with a different panel of the UE than an SSB beam transmitted by the serving TRP.

Aspect 24: The method of any of Aspects 21-23, wherein the configuration information transmitted to the UE causes the UE to switch from a cell associated with the serving TRP to one or more cells associated with the first candidate TRP and the second candidate TRP that satisfy the criteria to be paired with one another in the full-duplex communication mode or the simultaneous half-duplex mTRP communication mode.

Aspect 25: The method of any of Aspects 19-24, wherein the at least one candidate TRP is indicated by the mobility report based at least in part on an RSRP measurement associated with the SSB transmitted by the at least one candidate TRP satisfying a first threshold that has a negative value relative to an RSRP measurement associated with an SSB beam transmitted by the serving TRP or a second threshold, related to cell switching, that has a higher value relative to the RSRP measurement associated with the SSB beam transmitted by the serving TRP.

Aspect 26: The method of any of Aspects 19-24, wherein the at least one candidate TRP is indicated by the mobility report based at least in part on an RSRP measurement associated with the SSB beam transmitted by the at least one candidate TRP satisfying a first threshold that has a lower absolute value than a second threshold related to cell switching.

Aspect 27: The method of any of Aspects 19-24, wherein the at least one candidate TRP is indicated by the mobility report based at least in part on an RSRP associated with the SSB beam transmitted by the at least one candidate TRP satisfying a threshold related to cell switching.

Aspect 28: The method of any of Aspects 19-27, wherein the at least one candidate TRP is indicated by the mobility report based at least in part on the at least one candidate TRP indicating a capability to support the full-duplex or mTRP communication mode.

Aspect 29: The method of any of Aspects 19-28, wherein the at least one candidate TRP is indicated by the mobility report based at least in part on an SSB beam transmitted by the at least one candidate TRP being associated with a different panel of the UE than an SSB beam transmitted by the serving TRP.

Aspect 30: The method of any of Aspects 19-29, wherein the mobility report further indicates a recommended communication direction for the at least one candidate TRP.

Aspect 31: The method of Aspect 30, wherein the recommended communication direction for the at least one candidate TRP is based at least in part on an MPE constraint or a thermal balancing condition associated with the UE.

Aspect 32: The method of any of Aspects 19-31, wherein the mobility report further indicates a first SINR or CQI associated with using a first SSB beam of the at least one candidate TRP as an uplink beam and a second SSB beam as a downlink beam, and wherein the mobility report further indicates a second SINR or CQI associated with using the first SSB beam of the at least one candidate TRP as the downlink beam and the second SSB beam as the uplink beam.

Aspect 33: The method of any of Aspects 19-32, wherein the mobility report further indicates a first power headroom associated with using a first SSB beam of the at least one candidate TRP as an uplink beam and a second SSB beam as a downlink beam, and wherein the mobility report further indicates a second power headroom associated with using the second SSB beam as the uplink beam and the first SSB beam of the at least one candidate TRP as the downlink beam.

Aspect 34: The method of Aspect 33, wherein the first power headroom and the second power headroom are based at least in part on a maximum uplink transmit power limited by one or more self-interference measurements associated with the UE.

Aspect 35: The method of any of Aspects 19-34, further comprising: transmitting, to the UE, information configuring one or more CMRs and one or more self-interference measurement resources based at least in part on the mobility report indicating that the at least one candidate TRP satisfies criteria to be paired in the full-duplex communication mode; receiving, from the UE, one or more candidate downlink and uplink beam pairs to be paired in the full-duplex communication mode based at least in part on measurements of the one or more CMRs and the one or more self-interference measurement resources; and transmitting, to the UE, a final downlink and uplink beam pair to be used for paired TRPs that include the at least one candidate TRP and the serving TRP or another candidate TRP in the full-duplex communication mode.

Aspect 36: The method of any of Aspects 19-35, wherein the mobility report further indicates an identifier associated with the SSB beam transmitted by the at least one candidate TRP and a corresponding RSRP measurement associated with the SSB beam.

Aspect 37: An apparatus for wireless communication at a device, comprising a processor; memory coupled with the processor; and instructions stored in the memory and executable by the processor to cause the apparatus to perform the method of one or more of Aspects 1-18.

Aspect 38: A device for wireless communication, comprising a memory and one or more processors coupled to the memory, the one or more processors configured to perform the method of one or more of Aspects 1-18.

Aspect 39: An apparatus for wireless communication, comprising at least one means for performing the method of one or more of Aspects 1-18.

Aspect 40: A non-transitory computer-readable medium storing code for wireless communication, the code comprising instructions executable by a processor to perform the method of one or more of Aspects 1-18.

Aspect 41: A non-transitory computer-readable medium storing a set of instructions for wireless communication, the set of instructions comprising one or more instructions that, when executed by one or more processors of a device, cause the device to perform the method of one or more of Aspects 1-18.

Aspect 42: An apparatus for wireless communication at a device, comprising a processor; memory coupled with the processor; and instructions stored in the memory and executable by the processor to cause the apparatus to perform the method of one or more of Aspects 19-36.

Aspect 43: A device for wireless communication, comprising a memory and one or more processors coupled to the memory, the one or more processors configured to perform the method of one or more of Aspects 19-36.

Aspect 44: An apparatus for wireless communication, comprising at least one means for performing the method of one or more of Aspects 19-36.

Aspect 45: A non-transitory computer-readable medium storing code for wireless communication, the code comprising instructions executable by a processor to perform the method of one or more of Aspects 19-36.

Aspect 46: A non-transitory computer-readable medium storing a set of instructions for wireless communication, the set of instructions comprising one or more instructions that, when executed by one or more processors of a device, cause the device to perform the method of one or more of Aspects 19-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    measuring, while communicating with a serving transmit receive point (TRP) in a half-duplex communication mode and after a mobility event associated with the UE, one or more synchronization signal block (SSB) beams associated with one or more neighbor TRPs; and
    transmitting, to a base station, a mobility report indicating a first TRP based at least in part on determining that an SSB beam transmitted by the first TRP satisfies criteria to be paired in a communication mode with a second TRP different from the first TRP, wherein:
        the criteria are associated with switching from the half-duplex communication mode to a full-duplex communication mode or a simultaneous half-duplex multi-TRP (mTRP) communication mode,
        the communication mode includes a first communication direction for the first TRP and a second communication direction for the second TRP different from the first communication direction,
        at least one of the first communication direction and the second communication direction is an uplink communication direction, and
        the communication mode is the full-duplex communication mode or the simultaneous half-duplex mTRP communication mode.

2. The method of claim 1, wherein the mobility report indicates that the first TRP satisfies the criteria to be paired with the serving TRP in the full-duplex communication mode or the simultaneous half-duplex mTRP communication mode, and wherein the second TRP comprises the serving TRP.

3. The method of claim 1, wherein the first TRP and the second TRP satisfy the criteria to be paired with one another in the full-duplex communication mode or the simultaneous half-duplex mTRP communication mode.

4. The method of claim 3, wherein the first TRP and the second TRP transmit respective SSB beams that are associated with reference signal received power (RSRP) measurements that are higher than an RSRP measurement associated with an SSB beam transmitted by the serving TRP.

5. The method of claim 3, wherein the first TRP and the second TRP transmit an SSB beam that are associated with two different panels of the UE.

6. The method of claim 3, further comprising:
switching from a cell associated with the serving TRP to one or more cells associated with the first TRP and the second TRP that satisfy the criteria to be paired with one another in the full-duplex communication mode or the simultaneous half-duplex mTRP communication mode.

7. The method of claim 1, wherein the first TRP is indicated by the mobility report based at least in part on a reference signal received power (RSRP) measurement associated with the SSB beam transmitted by the first TRP satisfying a first threshold that has a negative value relative to an RSRP measurement associated with an SSB beam transmitted by the serving TRP or a second threshold, related to cell switching, that has a higher value relative to the RSRP measurement associated with the SSB beam transmitted by the serving TRP.

8. The method of claim 1, wherein the first TRP is indicated by the mobility report based at least in part on a reference signal received power (RSRP) measurement associated with the SSB beam transmitted by the first TRP satisfying a first threshold that has a lower absolute value than a second threshold related to cell switching.

9. The method of claim 1, wherein the first TRP is indicated by the mobility report based at least in part on a reference signal received power measurement associated with the SSB beam transmitted by the first TRP satisfying a threshold related to cell switching if no indication of any capability to support the full-duplex or mTRP communication mode.

10. The method of claim 1, wherein the first TRP is indicated by the mobility report based at least in part on the first TRP indicating a capability to support the full-duplex or mTRP communication mode.

11. The method of claim 1, wherein the first TRP is indicated by the mobility report based at least in part on the SSB beam transmitted by the first TRP being associated with a different panel of the UE than an SSB beam transmitted by the serving TRP.

12. The method of claim 1, wherein the mobility report further indicates a recommended communication direction for the first TRP.

13. The method of claim 12, wherein the recommended communication direction for the first TRP is based at least in part on a maximum permissible exposure constraint or a thermal balancing condition associated with the UE.

14. The method of claim 1, wherein the mobility report further indicates a first signal-to-interference-plus-noise ratio (SINR) or channel quality indicator (CQI) associated with using a first SSB beam of the first TRP as an uplink beam and a second SSB beam as a downlink beam, wherein the first SINR or CQI is based at least in part on a first self-interference measurement from the first SSB beam to the second SSB beam, wherein the mobility report further indicates a second SINR or CQI associated with using the first SSB beam of the first TRP as the downlink beam and the second SSB beam as the uplink beam, and wherein the second SINR or CQI is based at least in part on a second self-interference measurement from the second SSB beam to the first SSB beam.

15. The method of claim 1, wherein the mobility report further indicates a first power headroom associated with using a first SSB beam of the first TRP as an uplink beam and a second SSB beam as a downlink beam, and wherein the mobility report further indicates a second power headroom associated with using the second SSB beam as the uplink beam and the first SSB beam of the first TRP as the downlink beam.

16. The method of claim 15, wherein the first power headroom and the second power headroom are based at least in part on a maximum uplink transmit power limited by one or more self-interference measurements associated with transmitting from the uplink beam to the downlink beam.

17. The method of claim 1, further comprising:
receiving, from the base station, information configuring one or more channel measurement resources and one or more self-interference measurement resources based at least in part on the mobility report indicating that the first TRP satisfies criteria to be paired in the full-duplex communication mode;
transmitting, to the base station, one or more candidate downlink and uplink beam pairs to be paired in the full-duplex communication mode based at least in part on measurements of the one or more channel measurement resources and the one or more self-interference measurement resources; and
receiving, from the base station, a final downlink and uplink beam pair to be used for paired TRPs that include the first TRP and the serving TRP or another candidate TRP in the full-duplex communication mode.

18. The method of claim 1, wherein the mobility report further indicates an identifier associated with the SSB beam transmitted by the first TRP and a corresponding reference signal received power measurement associated with the SSB beam.

19. A user equipment (UE) for wireless communication, comprising:
one or more memories; and
one or more processors, coupled to the one or more memories, configured to:
measure, while communicating with a serving transmit receive point (TRP) in a half-duplex communication mode and after a mobility event associated with the UE, one or more synchronization signal block (SSB) beams associated with one or more neighbor TRPs; and
transmit, to a base station, a mobility report indicating a first TRP based at least in part on determining that an SSB beam transmitted by the first TRP satisfies criteria to be paired in a communication mode with a second TRP different from the first TRP, wherein:
the criteria are associated with switching from the half-duplex communication mode to a full-duplex communication mode or a simultaneous half-duplex multi-TRP (mTRP) communication mode,
the communication mode includes a first communication direction for the first TRP and a second communication direction for the second TRP different from the first communication direction,
at least one of the first communication direction and the second communication direction is an uplink communication direction, and the communication mode is the full-duplex communication mode or the simultaneous half-duplex mTRP communication mode.

20. The UE of claim 19, wherein the mobility report indicates that the first TRP satisfies the criteria to be paired with the serving TRP in the full-duplex communication mode or the simultaneous half-duplex mTRP communication mode, and wherein the second TRP comprises the serving TRP.

21. The UE of claim 19, wherein the first TRP and the second TRP satisfy the criteria to be paired with one another in the full-duplex communication mode or the simultaneous half-duplex mTRP communication mode.

22. The UE of claim 19, wherein the first TRP is indicated by the mobility report based at least in part on a reference signal received power (RSRP) measurement associated with the SSB beam transmitted by the first TRP satisfying a first threshold that has a negative value relative to an RSRP measurement associated with an SSB beam transmitted by the serving TRP or a second threshold, related to cell switching, that has a higher value relative to the RSRP measurement associated with the SSB beam transmitted by the serving TRP.

23. The UE of claim 19, wherein the first TRP is indicated by the mobility report based at least in part on a reference signal received power (RSRP) measurement associated with the SSB beam transmitted by the first TRP satisfying a first threshold that has a lower absolute value than a second threshold related to cell switching.

24. The UE of claim 19, wherein the first TRP is indicated by the mobility report based at least in part on a reference signal received power measurement associated with the SSB beam transmitted by the first TRP satisfying a threshold related to cell switching if no indication of any capability to support the full-duplex or mTRP communication mode.

25. The UE of claim 19, wherein the first TRP is indicated by the mobility report based at least in part on the first TRP indicating a capability to support the full-duplex or mTRP communication mode.

26. The UE of claim 19, wherein the first TRP is indicated by the mobility report based at least in part on the SSB beam transmitted by the first TRP being associated with a different panel of the UE than an SSB beam transmitted by the serving TRP.

27. The UE of claim 19, wherein the mobility report further indicates a recommended communication direction for the first TRP.

28. The UE of claim 19, wherein the one or more processors are further configured to:
receive, from the base station, information configuring one or more channel measurement resources and one or more self-interference measurement resources based at least in part on the mobility report indicating that the first TRP satisfies criteria to be paired in the full-duplex communication mode;
transmit, to the base station, one or more candidate downlink and uplink beam pairs to be paired in the full-duplex communication mode based at least in part on measurements of the one or more channel measurement resources and the one or more self-interference measurement resources; and
receive, from the base station, a final downlink and uplink beam pair to be used for paired TRPs that include the first TRP and the serving TRP or another candidate TRP in the full-duplex communication mode.

29. A non-transitory computer-readable medium storing one or more instructions for wireless communication, the one or more instructions comprising:
one or more instructions that, when executed by one or more processors of a user equipment (UE), cause the one or more processors to:
measure, while communicating with a serving transmit receive point (TRP) in a half-duplex communication mode and after a mobility event associated with the UE, one or more synchronization signal block (SSB) beams associated with one or more neighbor TRPs; and
transmit, to a base station, a mobility report indicating a first TRP based at least in part on determining that an SSB beam transmitted by the first TRP satisfies criteria to be paired in a communication mode with a second TRP different from the first TRP, wherein:
the criteria are associated with switching from the half-duplex communication mode to a full-duplex communication mode or a simultaneous half-duplex multi-TRP (mTRP) communication mode,
the communication mode includes a first communication direction for the first TRP and a second communication direction for the second TRP different from the first communication direction,
at least one of the first communication direction and the second communication direction is an uplink communication direction, and
the communication mode is the full-duplex communication mode or the simultaneous half-duplex mTRP communication mode.

30. An apparatus for wireless communication, comprising:
means for measuring, while communicating with a serving transmit receive point (TRP) in a half-duplex communication mode and after a mobility event associated with the apparatus, one or more synchronization signal block (SSB) beams associated with one or more neighbor TRPs; and
means for transmitting, to a base station, a mobility report indicating a first TRP based at least in part on determining that an SSB beam transmitted by the first TRP satisfies criteria to be paired in a communication mode with a second TRP different from the first TRP, wherein:
the criteria are associated with switching from the half-duplex communication mode to a full-duplex communication mode or a simultaneous half-duplex multi-TRP (mTRP) communication mode,
the communication mode includes a first communication direction for the first TRP and a second communication direction for the second TRP different from the first communication direction,
at least one of the first communication direction and the second communication direction is an uplink communication direction, and
the communication mode is the full-duplex communication mode or the simultaneous half-duplex mTRP communication mode.

* * * * *